United States Patent [19]

Powers et al.

[11] Patent Number: 4,474,924

[45] Date of Patent: Oct. 2, 1984

[54] STABILIZED SLURRIES OF ISOOLEFIN POLYMERS

[75] Inventors: Kenneth W. Powers, Berkeley Heights; Hsien C. Wang, Edison, both of N.J.

[73] Assignee: Exxon Research & Engineering Co., Florham Park, N.J.

[21] Appl. No.: 461,678

[22] Filed: Jan. 27, 1983

[51] Int. Cl.$^3$ .............................................. C08K 5/02
[52] U.S. Cl. ..................................... 524/468; 524/465;
524/473; 524/505; 524/792; 524/793; 524/856;
524/923; 525/76; 525/86; 525/94; 525/98
[58] Field of Search ............... 524/505, 468, 473, 465,
524/792, 793, 923, 856; 513/334; 525/76, 314,
86, 94, 98

[56] References Cited

U.S. PATENT DOCUMENTS 4,098,980 7/1978 Markle et al. ........................ 525/94
4,252,710 2/1981 Powers et al. ...................... 524/856
4,358,560 11/1982 Powers et al. ...................... 524/468

Primary Examiner—Herbert J. Lilling
Attorney, Agent, or Firm—Harvey L. Cohen

[57] ABSTRACT

Polymerization slurries of elastomeric isoolefin homopolymers and copolymers, such as butyl rubber, in diluents such as methyl chloride are effectively stabilized against agglomeration of polymer particles through addition of minor proportions of an hydrogenated preformed copolymer stabilizer having both a lyophobic and a lyophilic portion. The chemical and structural nature of the lyophobic and lyophilic portions which comprise the copolymer stabilizer are significant in determining the extent and method of hydrogenation for production of the most effective stabilizer. Agglomeration of polymer products is effectively prevented, yielding a number of significant processing advantages. The process is especially adaptable to the production of isobutylene-isoprene butyl rubber.

39 Claims, No Drawings

STABILIZED SLURRIES OF ISOOLEFIN POLYMERS

BACKGROUND OF THE INVENTION

1. Field of the Invention

This invention relates to the polymerization of elastomeric isoolefinic homopolymers and copolymers, especially the polymerization reaction required to produce the isobutylene-isoprene form of butyl rubber. More particularly, the invention relates to an improved method of stabilizing against agglomeration the polymerization slurries used in the preparation of such polymers; the medium, or diluent of such slurries being methyl chloride or certain other polar chlorinated hydrocarbon diluents.

2. Prior Art

The term "butyl rubber" as used in the specification and claims means copolymers of $C_4$-$C_7$ isoolefins and $C_4$-$C_{14}$ conjugated dienes which comprise about 0.5 to about 15 mole percent conjugated diene and about 85 to 99.5 mole percent isoolefin. Illustrative examples of the isoolefins which may be used in the preparation of butyl rubber are isobutylene, 2-methyl-1-propene, 3-methyl-1-butene, 4-methyl-1-pentene and $\beta$-pinene. Illustative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. The preparation of butyl rubber is described in U.S. Pat. No. 2,356,128 and is further described in an article by R. M. Thomas et al. in Industrial and Engineering Chemistry, vol. 32, pp. 1283 et seq., October, 1940. Butyl rubber generally has a viscosity average molecular weight between about 100,000 to about 800,000, preferably about 250,000 to about 600,000 and a Wijs Iodine No. of about 0.5 to 50, preferably 1 to 20.

The term isoolefin homopolymers or polymers as used herein is meant to encompass those homopolymers of $C_4$-$C_7$ isoolefins particularly polyisobutylene, which have a small degree of terminal unsaturation and certain elastomeric properties.

The principal commercial forms of these butyl rubber and isoolefin polymers such as isobutylene-isoprene butyl rubber and polyisobutylene, are prepared in a low temperature cationic polymerization process using Lewis acid type catalysts, typically aluminum chloride being employed. Boron trifluoride is also considered useful in these processes. The process extensively used in industry employs methyl chloride as the diluent for the reaction mixture at very low temperatures, that is less than minus 90° C. Methyl chloride is employed for a variety of reasons, including the fact that it is a solvent for the monomers and aluminum chloride catalyst and a nonsolvent for the polymer product. Also, methyl chloride has suitable freezing and boiling points to permit, respectively, low temperature polymerization and effective separation from the polymer and unreacted monomers.

The slurry polymerization process in methyl chloride offers a number of additional advantages in that a polymer concentration of approximately 30% by weight in the reaction mixture can be achieved, as opposed to the concentration of only about 8% to 12% in solution polymerization. Also, an acceptable, relatively low, viscosity of the polymerization mass is obtained enabling the heat of polymerization to be removed more effectively by heat exchange. Slurry polymerization processes in methyl chloride are used in the production of high molecular weight polyisobutylene and isobutylene-isoprene butyl rubber polymers.

Notwithstanding the widespread use of the slurry polymerization process in methyl chloride, there are a number of problems in carrying out this process which are related to the tendency of the polymer product particles to agglomerate, and thereby destabilize the slurry dispersion. In the absence of special additives, the rate of agglomeration increases rapidly as reaction temperature approaches $-90°$ C. and it is not possible to maintain a stable slurry above $-80°$ C. These agglomerated particles tend to adhere to, grow and plate out on all surfaces they contact, such as reactor discharge lines, as well as reactor inlet lines and any heat transfer equipment being used to remove the exothermic heat of polymerization, which is critical since low temperature reaction conditions must be maintained.

One technique used by industry to circumvent this difficulty has been operation of the reactor below $-80°$ C. and with high agitation. It has become standard practice to design manufacturing facilities with additional reactor equipment so that the reaction process can be cycled between alternate reactor systems so that at any given time one or more reactors are in the process of being cleaned or adhered polymer. If a stable slurry is produced and maintained in a non-fouling condition, substantial economies in equipment installation and process techniques are achieved.

A general reference text which discusses the theory and principles concerning dispersion polymerization and in particular the use of block and graft copolymers as dispersion stabilizers is "Dispersion Polymerization in Organic Media", edited by K. E. J. Barrett, John Wiley & Sons, 1975. While this text, particularly in Chapter 3, discloses the use of block or graft copolymers having an insoluble component, or anchor group, and a diluent-soluble component in a number of dispersion polymerization processes, no disclosure is made of any stabilizer system useful in the methyl chloride slurry polymerization process for isoolefin homopolymers or butyl rubber copolymers as disclosed in accordance with the present invention.

In published Netherlands Application 770760 (1977), filed in the U.S. on June 14, 1976, as Ser. No. 699,300, Markle et al disclose a non-aqueous dispersion polymerization process for conjugated diolefins in the presence of a block copolymer dispersion stabilizer, at least one block being soluble in the liquid organic dispersion medium and at least another block being insoluble in the dispersion medium. The Markle et al disclosure deals with the polymerization of a conjugated diolefin monomer in a liquid hydrocarbon dispersion medium such as n-butane, neopentane or mixed isomeric pentanes in the presence of a Ziegler-Natta Catalyst. The conjugated diolefins, particularly preferred by Markle et at, are butadiene-1,3, isoprene and piperylene. Markle et al also disclose mixtures of conjugated diolefins.

The process of the present invention is considered distinguished from the disclosure of Markle et al in that it relates to a cationic polymerization carried out in a polar chlorinated hydrocarbon diluent, such as methyl chloride, utilizing stabilizers which are especially effective in that polymerization process. Markle et al deal with coordination polymerization processes conducted in a nonpolar liquid hydrocarbon diluent.

An effective method for stabilizing methyl chloride slurries, or slurries in various polymerization diluents used in the production of isoolefin polymer products, using chemical additive stabilizers is disclosed by K. W. Powers and R. H. Schatz in U.S. Pat. No. 4,252,710; the invention disclosed herein is an improvement over that earlier teaching. The '710 reference discloses that such slurries can be stabilized through the addition of minor proportions of a preformed copolymer stabilizer or an in situ formed stabilizer. The stabilizer is generally described as having a lyophilic, diluent soluble portion and a lyophobic, diluent insoluble, isoolefin homopolymer or butyl rubber soluble or adsorbable portion; in the case of an in situ formed stabilizing agent, the stabilizer precursor was disclosed as a lyophilic polymer containing a functional group capable of copolymerizing or forming a chemical bond with the isoolefin polymer or butyl rubber copolymer being formed in the polymerization process, the latter polymer or copolymer being the lyophobic portion of the stabilizing agent. The '710 reference discloses that certain categories of preformed stabilizers, while effective as slurry stabilizers are preferably added upon completion of polymerization because they contain substantial amounts of cationically active unsaturation or functional groups. A continuation-in-part patent to the same inventors, U.S. Pat. No. 4,358,560, based on application Ser. No. 236,719, further defines the effect of such cationic activity on the use of preformed stabilizers. The invention disclosed herein is a further improvement over the earlier teachings of Powers and Schatz in the '560 reference as well.

The '710 and '560 patents broadly disclose "hydrogenated diene polymers, e.g. hydrogenated polybutadiene" (column 5, lines 15–16) as suitable lyophobic materials; claim 8 in each patent reflects that language as well. Examples 2(b) and 3 of the '710 patent demonstrate the limitations of certain of the stabilizers in which cationically active isoprene moieties are present. These patent references represent a starting point for the comprehensive and specific discoveries disclosed herein.

SUMMARY OF THE INVENTION

In accordance with the present invention, there has been discovered a method of stabilizing a polymerization slurry against agglomeration, the slurry containing an isoolefin homopolymer or a butyl rubber copolymer in a polymerization diluent; the diluent being methyl chloride, methylene chloride, vinyl chloride or ethyl chloride, which comprises incorporating into the reaction mixture which comprises the mixture of monomers, catalyst and diluent, or into the polymerization product slurry about 0.05% to 20% by weight, based upon the weight of product isoolefin homopolymer or product butyl rubber copolymer, of a stabilizing agent, the stabilizing agent being a preformed copolymer having a lyophilic, diluent soluble portion and a lyophobic, diluent insoluble, isoolefin homopolymer or butyl rubber soluble or adsorbable portion, the stabilizing agent being capable of forming an adsorbed solubilized polymer coating around the precipitated isoolefin homopolymer or butyl rubber copolymer to stabilize the slurry, wherein the preformed copolymer stabilizing agent is an hydrogenated block copolymer, the hydrogenation reducing the cationically active unsaturation initially present in the stabilizing agent and also increasing the stabilizing effectiveness of the copolymer. The exact quantity of stabilizing agent added to the reaction mixture is a function of the exact concentration of the feed blend and the estimated degree of conversion of monomers. In a typical butyl rubber reaction process for manufacturing isobutylene-isoprene butyl rubber, the reactor feed blend which is prepared contains about 25% to 35% by weight monomers, and typically 80% to 90% by weight of monomers are converted to polymer product. When stabilizing agents are utilized monomer concentration in the feed blend is about 30 to 45% and conversion is about 80 to 95%.

DETAILED DESCRIPTION

The present invention deals with a modified form of stabilizing agent, which is effective in the polymerization diluent and serves to stabilize the polymerization slurry comprised of the polymer or copolymer particles which are produced in the basic polymerization reaction. As used herein, the term "polymerization diluent" is meant to refer to methyl chloride, methylene chloride, vinyl chloride and ethyl chloride. Methyl chloride is the preferred diluent in all embodiments of this invention.

Utilization of a hydrogenated preformed block copolymer, which is both lyophilic and lyophobic in the presence of the polymerization diluent, involves first providing a suitable copolymer. Generally, a preformed copolymer stabilizer must have a diluent insoluble anchor portion, which is adsorbable or soluble in polymerized isoolefin or butyl rubber, as well as a diluent soluble portion which functions to keep the adsorbed polymer dispersed in the polymerization diluent.

The preformed block copolymer stabilizer, subject to certain limitations as set forth below, may be added to the reaction mixture and can be present throughout the polymerization reaction to prevent agglomeration at reaction temperatures. Alternatively, a portion of the preformed stabilizer can be added to the reaction mixture and additional stabilizer can be injected into the reactor effluent lines to prevent agglomeration in downstream equipment.

Certain categories of preformed stabilizers, while being effective as slurry stabilizers in the present invention, are preferably added upon completion of the polymerization reaction. Thus, they are preferably added to the reactor effluent in order to prevent agglomeration during the final stages of processing. These preformed stabilizer copolymers are defined as those containing a substantial amount, even after hydrogenation, of cationically active unsaturation or functional groups, the functional groups being hydroxyl, ester, ketone, amino, aldehyde, nitrile, amido, carboxyl, sulfonate, mercaptan, ether, anhydride, nitro, active allylic or active tertiary halogen. Functional groups with a low degree of cationic activity, or present at low concentrations may be only marginally active under typical butyl polymerization conditions. The degree to which these groups participate in the polymerization reaction to form chemical bond attachments to the product polymer depends upon the polymerization conditions (monomer conversion, temperature, steadystate monomer and stabilizer concentrations, etc.) Under some polymerization conditions marginally active functional groups are effectively inert so that no appreciable chemical bond attachment to the product polymer occurs and the preformed stabilizing agent primarily functions by adsorption on the product slurry particles. Under other polymerization conditions appreciable chemical bond attachment to the product polymer can occur through these marginally cationically active groups. To the extend that chemical attachment occurs, the preformed copolymer stabilizer is acting as a functional lyophile and forms, in situ, a new stabilizer with the product polymer as the lyophobe.

If cationic activity is even higher, then extensive and multiple attachments to the product polymer can occur and the stabilizer may become undesirable for use during polymerization. Given that a stabilizing agent as disclosed herein functions effectively to stabilize the product polymer slurry, its suitability as a preformed stabilizing agent will be predicated, in part, on formation of a gel-free polymer product; the absence of gelled material on reactor surfaces is also a desirable feature. The end use application to which the product polymer will be put can have significant impact on the choice of stabilizing agent and its tendency to result in gel formation under the polymerization conditions. Some applications may require that the product be gel free, whereas in others the presence of gel may be tolerable or even preferable (e.g., mastics).

The lyophilic portion of the preformed copolymer stabilizing agent employed in the present invention must be completely soluble in, or miscible with, the polymerization diluent. A suitable criterion is that the lyophilic portion have a Flory-Huggins interaction parameter with the polymerization diluent of less than 0.5 or a Flory solvency coefficient with the polymerization diluent greater than 1.

Suitable lyophilic polymers which meet these requirements and which do not adversely affect the catalyst or polymerization conditions include polystyrene, polyvinyl chloride, polyvinyl bromide and neoprene, with the preferred lyophilic portion being polystyrene, polyvinyl chloride, or polyvinyl bromide. Also suitable are substituted styrene lyophiles such as mono-, di- and tri-substituted styrenes, the substituents being halogen, such as chlorine, or lower ($C_1$–$C_5$) alkyl groups, as illustrated by alpha-methyl styrene, para-t-butyl-styrene, p-chloro-styrene and similar ring chlorinated styrenes. It is also suitable to employ as the lyophilic portion combinations of two suitable lyophilic polymers such as copolymers of styrene and vinyl chloride. Thus, the term "lyophilic portion" as used herein is meant to encompass a portion of one or more monomers which meet the criteria for suitable lyophiles in the practice of the present invention. This lyophilic portion should have a degree of polymerization (D.P.) of at least about 20 and up to about 5,000 or 6,000.

The preferred lyophilic portion, as disclosed herein, is polystyrene and, as will be described in examples below, the form in which the polystyrene is present is an important factor. The preferred block copolymer stabilizers contain polystyrene at a level of more than about 45 weight percent as a polystyrene block component, most preferably between about 60 and about 80 weight percent polystyrene block content. In some instances the overall styrene content of a potential stabilizer may exceed the preferred 45 weight percent level just recited, but a significant portion of the styrene may be distributed within the lyophobic portion of the block copolymer, e.g., the butadiene portion. In those circumstances, the polystyrene block content would not exceed the minimum preferred level and the copolymer would not perform effectively.

A number of significant factors influence the selection of the unhydrogenated lyophobic portion of the stabilizing agent. The lyophobic portion is insoluble in the polymerization diluent but should have a high affinity for the product polymer so that it is adsorbed or otherwise bonded onto the polymer particle. A lyophobic portion composed of the same material being produced in the cationic Lewis Acid catalyzed polymerization reaction, such as isobutylene homopolymer or isobutylene-isoprene butyl copolymer, is a suitable lyophobic portion in the preformed stabilizer agent employed in the present invention. Other suitable lyophobic materials generally include diluent insoluble polymers having a solubility parameter less than about 8 and a degree of polymerization (D.P.) of at least about 10. Suitable materials include polyisoolefins generally of $C_4$–$C_7$ isoolefins, such as polyisobutylene, butyl rubber copolymers generally, such as isobutylene-isoprene butyl rubber, polybutadiene, polyisoprene, ethylene/propylene copolymers, EPDM terpolymers, SBR Rubbers, which are styrene/butadiene random copolymers of low styrene content, and polydimethyl silicone. Particularly preferred preformed stabilizers for use in the production of isobutylene-isoprene butyl rubber include a preformed block copolymer stabilizer agent composed of an isobutylene-isoprene portion block with about 45 to 80 weight percent styrene block, a styrene-EPDM preformed stabilizer, a styrene-isoprene block copolymer and a styrene-butadiene block copolymer. In the present invention the term stabilizer copolymer or stabilizer polymer includes blocks, grafts, mixtures thereof or other configurations resulting from copolymerization reactions; a block copolymer is preferred.

Lyophobic Portion of Stabilizer Copolymer

A. Hydrogenated Polybutadiene

The choice of the lyophobic portion of the stabilizer copolymer is particularly significant. For example, a lyophobe of polybutadiene in a block copolymer of styrene and butadiene generally results in desirable stabilizing agents because they are commercially available and relatively economical, but they suffer from several deficiencies. One of their deficiencies is that they are not as effective on a weight basis as more preferred stabilizers; a more serious deficiency though is that the polybutadiene lyophobic block has some degree of cationic activity under butyl polymerization conditions. This activity can lead to some or all of the polybutadiene based stabilizers becoming chemically bound to the butyl during polymerization to form in situ a new stabilizer with a much larger lyophobe (the butyl polymer being produced); and the in situ formed stabilizer is no longer of optimum composition and is less desirable than the original block copolymer. Furthermore, chemical attachments can sometimes occur at many sites along the polybutadiene chain to produce a cross-linked or gelled butyl product which is undesirable for many purposes. The degree of cationic activity manifested by the polybutadiene lyophobic chain is dependent not only upon the polymerization conditions but also upon the morphology of the preformed block copolymer and the microstructure of the polybutadiene lyophobic block. The cationic activity is less if the polybutadiene is at the center of a radial block and is less if the microstructure contains fewer 1,2 butadiene units. Nevertheless, the activity is always great enough to impair effectiveness and is often great enough to make it undesirable to use these resins as stabilizers because of their adverse effects on isoolefin homopolymer and butyl rubber copolymer product quality due to branching and gel formation.

We have discovered that this undesirable cationic activity can be reduced or eliminated by hydrogenation which saturates the active olefinic unsaturation in the lyophobic portion (e.g., a polybutadiene block). We have also surprisingly discovered that as the unsaturated lyophobic block is hydrogenated, effectiveness of the partially hydrogenated block copolymer as a slurry stabilizer for butyl rubber polymerization improves (that is, it produces more stable butyl slurries with less of the block copolymer being required), but on continued hydrogenation effectiveness rapidly diminishes. Hydrogenation has at least two beneficial effects: (1) it decreases cationic activity (monotonically and progressively as hydrogenation proceeds); and (2) it improves effectiveness (the latter not progressively, since effectiveness generally declines beyond an intermediate hydrogenation level).

In a stabilizer copolymer utilizing polybutadiene, for example, the beneficial reduction in cationic activity is progressive and continuous as hydrogenation proceeds, but it is not directly proportional to the degree of hydrogenation because the different types of double bonds in the polybutadiene block have quite different cationic activities and quite different susceptibility to hydrogenation. Cationic activity is dependent upon the fraction of double bonds of various activities remaining rather than simply upon the fraction of the total unsaturation remaining and hydrogenation does not randomly remove unsaturation but selectively removes the types of double bonds most susceptible to hydrogenation under the condition being used. The relative susceptibility to hydrogenation of a given type of double bond is not necessarily or always the same as its relative cationic activity, so there is limited predictability between reduction in cationic activity and degree of hydrogenation and as noted above, stabilizer effectiveness is not a simple function of the degree of hydrogenation. In a polybutadiene block the double bonds which are cationically most reactive during butyl polymerization are the pendant vinyl double bonds resulting from 1,2 incorporation of the polybutadiene and cationic activity of the block copolymer is largely controlled by the fraction of the vinyl double bonds remaining. Cationic activity falls very rapidly as these vinyl double bonds are saturated and only very slowly as the cis and trans in-chain double bonds resulting from 1,4 butadiene incorporation are saturated. Furtunately these vinyl double bonds in polybutadiene are also the most susceptible to hydrogenation and are selectively saturated during the early stages of hydrogenation. Thus cationic activity falls rapidly during the early stages of hydrogenation and then much more slowly as the in-chain double bonds are saturated. In order to reduce cationic activity of the block copolymer stabilizer sufficiently to avoid gel formation in the butyl product, it is desirable to remove essentially all of the very active pendant unsaturation resulting from 1,2 butadiene units, but a considerable amount of the less active in-chain unsaturation can be left. However, as noted previously, hydrogenation which reduces cationic activity and therefore the tendency to gel formation is not the only criteria for stabilizer performance.

The effect of hydrogenation on performance of the block copolymer as a slurry stabilizer, with performance going through a maximum at some intermediate hydrogenation level, suggests that opposing effects are being produced. Without wishing to be bound by theory it is believed that another important reason for the beneficial effect of hydrogenation is that it lowers the solubility parameter of the lyophobic block so that it becomes a better anchoring group. For example, as a polybutadiene block is hydrogenated its solubility parameter falls from that of polybutadiene (approx. 8.5) toward that of polyethylene (approx. 7.95) so that it becomes less soluble in methyl chloride and more compatible with butyl (solubility parameter=7.85). If that were the only effect, performance would be expected to improve continuously with degree of hydrogenation. An opposing effect is apparently the development of crystallinity in the polyethylene chain formed as the polybutadiene is hydrogenated. When enough crystallinity forms the interchain associations become strong enough that the entire styrene/hydrogenated butadiene block copolymer becomes insoluble in methyl chloride and then it is ineffective as a stabilizer. The development of insolubility with degree of hydrogenation has been observed and is described in the examples herein.

The effectiveness of a block copolymer composed of suitable lyophobic (e.g., polybutadiene) and lyophilic (e.g., polystyrene) blocks as a stabilizer depends upon a number of factors, but the solution properties of the block copolymer in the polymerization system are particularly important. In a system where the stabilizer is functioning acceptably the block copolymer is believed to be present in three different conditions:

(1) Some is adsorbed or anchored on the surface of the dispersed phase (e.g., butyl)
(2) Some is dissolved in the solvent (e.g., methyl chloride) as a unimer
(3) Some is in the solvent in associated form as micelles The term unimer is used in the literature relating to block copolymers. Block copolymers tend to aggregate and form clusters or micelles in solvents which are selective for one of the blocks only. In these selective solvents, there is an equilibrium between single block copolymer molecules in solution and the micellor aggregates. A single block copolymer in solution (but tightly coiled since one of the blocks is insoluble) is termed a unimer to distinguish it from the micellor aggregates. ("Micelle Formation by Butadiene/Styrene Block Copolymers in n-Alkanes" by Stacy and Kraus. Polyner Engineering and Science, Vol. 17, No. 8, Aug. 1977.)

The fraction of the block copolymer which is adsorbed on the dispersed phase is functioning effectively as a stabilizer. Effectiveness is diminished as the block copolymer becomes too soluble (not strongly enough anchored on the dispersed phase) or as it becomes too strongly self associated in stable micelles.

Furthermore, there is an equilibrium between the three forms of the block copolymer. In particular the unimer is in equilibrium with the surface adsorbed block copolymer and with the micellor associated block copolymer. Block copolymer is adsorbed on the dispersed phase surface by removing unimer from solution, and in order for this process to continue the unimer in solution must be replaced by disassociation from micelles. When the stabilizer is used during polymerization, new dispersed phase surface is continually being formed and so there must be a flow of the block copolymer from micelles into solution and then onto the new surface. The thermodynamics and kinetics of this flow are important in determining how effective the block copolymer is as a stabilizer.

The solution properties of, e.g., styrene/butadiene, block copolymers in methyl chloride can be observed to change with degree of hydrogenation. At a styrene level and molecular weight where they are effective as stabilizers for butyl slurries (for example, 70 wt. % stryene and $>60,000\overline{M}_n$) the unhydrogenated block copolymer is completely soluble at 5% in cold methyl chloride to give an optically clear solution. In comparison, the fully hydrogenated block copolymer is essentially completely insoluble. At intermediate hydrogenation levels the solution becomes progressively more hazy, which is believed to be due to more and more of the block copolymer being present in more stable and larger micelles. The block copolymer is completely ineffective as a stabilizer for butyl slurries when it has become insoluble in methyl chloride but effectiveness begins to diminish at some point before actual insolubility occurs (e.g., where the unimer concentration is low and where the association into micellor aggregates is strongly favored over adsorption onto the butyl particle surfaces). Since hydrogenation continuously improves one aspect of performance of a slurry stabilizer by reducing undesirable cationic activity and, in addition, by reducing the solubility parameter (of, e.g., polybutadiene) to improve anchoring on the butyl particle, it is desirable to hydrogenate to the highest possible level consistent with the avoidance of development of crystallinity and/or adverse solubility properties.

The hydrogenation level at which crystallinity begins to develop and/or solution properties begin to be adversely affected is different for different block copolymers, and for different methods of hydrogenation, and hence the optimum hydrogenation level must be determined experimentally. The optimum level depends upon the block copolymer composition, its structure, and the microstructure as well as upon the method of hydrogenation. On a relative basis, and for styrene/butadiene block copolymers, a higher degree of hydrogenation is permissible with block copolymers of higher styrene content because solubility of higher styrene content polymers is depressed more slowly by incipient crystallinity in the polybutadiene lyophobic block. Higher degrees of hydrogenation are also permissible in block copolymers with a structure which favors intra rather than interchain lyophobic block (e.g., polybutadiene) associations. Thus simple diblock polymers are more prone to form interchain crystallites and should be hydrogenated to a lower level than multi-arm block copolymers with the lyophobic block portion comprising a central core of the multi-arm polymer.

In stabilizer block copolymers where the lyophobic portion is polybutadiene, the polybutadiene microstructure plays a significant role in determining the preferred hydrogenation level and, in fact, in determining whether or not any hydrogenation level exists at which good performance can be achieved. For example, a useful technique for preventing the development of crystallites and retaining desirable solubility properties at higher hydrogenation levels is to build randomization into the polybutadiene block prior to hydrogenation so that the formation of long polymethylene sequences is prevented when the block copolymer is hydrogenated. The polymethylene sequences are formed by hydrogenation of 1,4 polybutadiene sequences in the polybutadiene block. The sequences are broken up by an ethyl side chain (a butene-1 unit) each time a 1,2 enchained polybutadiene is encountered and broken up by a double bond each time a butadiene unit is left unhydrogenated. Hence, in an hydrogenated, high 1,4 polybutadiene block where the only randomizing feature to break up polymethylene sequences is residual unsaturation, crystallinity and solubility problems are encountered at quite low hydrogenation levels, whereas at higher 1,2 levels where the ethyl side chain becomes another randomizing feature to break up the polymethylene sequences, crystallinity does not appear until higher degrees of hydrogenation are reached. Thus, it becomes desirable to increase the 1,2 content of the polybutadiene block (which of itself is surprising since it would seem to be detrimental because of the amount of cationically active unsaturation is increased in polymers having higher contents of 1,2 enchained units) in order to be able to hydrogenate to a higher level while avoiding crystallinity and retaining proper solubility. On the other hand, too much 1,2 content can also be detrimental because sequences of 1,2 polybutadiene begin to be present in the polybutadiene block and these form polybutene-1 sequences upon hydrogenation. The polybutene-1 sequences adversely affect solution properties even more quickly than do the polymethylene sequences from hydrogenated 1,4 polybutadiene and their presence must also be avoided. These sequences also form quickly during hydrogenation since all the vinyl unsaturation is preferentially hydrogenated first. Because relatively short polybutene-1 sequences are detrimental, it is not possible to achieve the degree of randomization of the polymethylene sequences which is necessary to prevent crystallinity from them simply by increasing 1,2 content alone to a preferred level; an additional randomizing factor such as unhydrogenated 1,4 units must also be provided. Generally, about 5 to about 50 percent vinyl unsaturation should initially be present in the stabilizer copolymer; preferably about 10 to about 48 percent; more preferably about 20 to about 46 percent; most preferably about 32 to about 44 percent. Optimum randomization from 1,2 units is achieved at a polybutadiene microstructure with about 40% vinyl unsaturation prior to hydrogenation.

One skilled in the art can also introduce other randomizing factors into the hydrogenated polybutadiene block (as well as other lyophobic portions) to prevent crystallinity from developing. In one method other monomers are copolymerized with butadiene to produce a copolymeric lyophobic block which, even though fully hydrogenated remains non-crystalline. Thus some styrene or isoprene is copolymerized with the butadiene to break up long 1,4 polybutadiene sequences and prevent crystallinity from developing during hydrogenation. Generally, the objective is to achieve the degree of randomization necessary to prevent crystallinity from developing without adversely affecting any other properties of the lyophobic block.

The method used to effect hydrogenation of the lyophobic portion also bears on the preferred hydrogenation level because it influences randomization. It is desirable to employ hydrogenation methods which produce the most random hydrogenated chain because the highest hydrogenation levels are attained with less chance of crystallinity developing. A particularly desirable way of effecting hydrogenation is through the use of diisobutyl aluminum hydride (as described in Example 3A). Hydrogenation of a polybutadiene lyophobe with diisobutyl aluminum hydride produces some cyclization of the polybutadiene to introduce another randomizing feature and so permits a higher hydrogenation level while retaining suitable solution properties. There are of course other well known methods of cyclizing polybutadiene and so this additional randomizing feature could be introduced in a separate or combined step with other hydrogenation methods. Diisobutyl aluminium hydride is unique in that it produces a desired degree of cyclization as a side reaction accompanying reduction. Furthermore, the amount of cyclization can be controlled to some degree by controlling reaction and quenching conditions (see, e.g., G. Hata et al., J. Org. Chem. 28, 3237 (1963)).

Aside from this possibility of introducing a randomization feature, such as cyclization, during hydrogenation, the various hydrogenation methods differ in the manner in which hydrogenation is accomplished and so the microstructure of the partially hydrogenated lyophobe is different under different hydrogenation conditions. If no new randomizing feature is introduced the fully hydrogenated block copolymer is the same regardless of the hydrogenation method employed, but the partially hydrogenated polymer may be quite different because various hydrogenation methods differ with respect to the selectivity with which the different kinds of double bonds are hydrogenated and with respect to the randomness with which double bonds of a given type are hydrogenated.

By way of example, the pendant vinyl double bonds resulting from 1,2 butadiene units are the most reactive cationically and are responsible for causing gel in the butyl rubber product produced with unmodified block copolymers as slurry stabilizers. It is desirable to use hydrogenation methods which selectively saturate the vinyl unsaturation first in order to impart randomization in the hydrogenated polybutadiene block, and also that leave all residual unsaturation in the least objectionable in-chain type. For example, for chemical hydrogenation the rate of addition of diisobutyl aluminum hydride to olefins of different structures decreases in the following sequence:

$RCH=CH_2 > RR'C=CH_2 >> RCH=CHR'$, in the ratio of approximately 100:50:1 respectively. Note that the first structure corresponds to 1,2 polybutadiene and the last to 1,4-polybutadiene (see, e.g., K. Ziegler et al, Justis Liebigs Ann Chem. 589, 91-121 (1954); "The Use of Aluminum Alkyls in Organic Synthesis," p. 49, Ethyl Corp. and references therein). The greater selectivity of hydrogenation of 1,2 polybutadiene sequence over 1,4 is indicated by the fact that none of the 1,2 type remains after hydrogenating 50% of the unsaturation originally present in a styrene butadiene block copolymer resin originally containing 15% 1,2 type.

With regard to catalytic hydrogenation, this high degree of selectivity is best achieved by using mild hydrogenation conditions and employing homogeneous catalysts. For example, at 80° C. and an Al/Co ratio of 4/1 it requires approximately 70% total saturation to remove all of the 1,2 unsaturation, virtually independently of the amount of 1,2 originally present. Under these conditions, the 1,2 and cis 1,4 polybutadiene are nearly equally reactive whereas the trans 1,4 polybutadiene is quite unreactive. After hydrogenation, the remaining unsaturation is almost exclusively trans 1,4.

In addition to selectivity it is important to randomly hydrogenate the unsaturation so that the residual double bonds left are distributed randomly along the block polymer chain to break up potentially crystallizable (e.g., polymethylene) sequences. In the case of polybutadiene, if some of the polybutadiene, or even part of individual chains is fully hydrogenated while some is unhydrogenated, the resulting polymer is partly crystalline and only partly soluble in methyl chloride and is not as effective a slurry stabilizer for butyl polymerization. The heterogenous hydrogenation catalysts listed in Example 3 are more prone to leave the residual unsaturation in unhydrogenated sequences and are less desirable than chemical reducing agents or homogeneous hydrogenation catalysts. However, any hydrogenation method can be employed provided sufficient randomization is achieved in the hydrogenated block so that it retains suitable solubility characteristics at a residual unsaturation level low enough to eliminate the undesirable cationic activity; as a minimum requirement, the hydrogenated stabilizer should not be insoluble in the polymerization or reaction mixture.

B. Hydrogenated Polyisoprene

While application of the above principles enables the designing of very desirable stabilizing agents based upon styrene/partially hydrogenated butadiene block copolymers, other equally desirable stabilizing agents can be designed based upon styrene/hydrogenated isoprene block copolymers. Styrene/isoprene block copolymers are desirable stabilizing agents because like the styrene/butadiene block copolymers they are commercially available and relatively economical to produce. The unhydrogenated styrene/isoprene block copolymers though are even less attractive as butyl slurry stabilizers than the unhydrogenated styrene/butadiene block copolymers because the unsaturation in polyisoprene is much more active under cationic butyl polymerization conditions than is the unsaturation in polybutadiene and use of unhydrogenated styrene/isoprene block copolymers as stabilizers during butyl polymerization results in a severly cross-linked or gelled butyl product which is unsuitable for most applications.

As with polybutadiene, the degree of cationic activity exhibited by the polyisoprene lyophobic chain is dependent upon the butyl polymerization conditions, the morphology of the block copolymer and the microstructure of the polyisoprene lyophobic block. Much of the previous discussion relating to polybutadiene is directly applicable although there are several important differences. The in-chain unsaturation resulting from 1,4 incorporated isoprene is much more active under cationic conditions than is the in-chain unsaturation resulting from 1,4 incorporated butadiene. This is due to the more highly polarizable, more substituted type IV in-chain unsaturation in polyisoprene which is intrinsically more active than is the type II in-chain unsaturation resulting from 1,4 incorporated butadiene. (Classification of unsaturation by "type" can be found in U.S. Pat. No. 4,245,060, col. 3, lines 1-40). Furthermore, the pendant unsaturation resulting from 3,4 incorporated isoprene is extremely active under butyl polymerization conditions and is very prone to cause gel; it must be essentially completely removed to enable polymerization of gel free butyl rubber. As with the polybutadiene block copolymers, the exact degree of hydrogenation necessary to avoid gel is again a function of polymerization conditions and the polyisoprene microstructure and must be determined experimentally. The cationic activity is less if the polyisoprene is at the center of a radial block and is less if the microstructure contains fewer 3,4 isoprene units. Additionally, warmer polymerization temperatures tend to increase the chances of gel formation. In general though, essentially all of the 3,4 enchained isoprene moieties must be hydrogenated and more than about 80% of the total unsaturation must be saturated by the hydrogenation, preferably more than about 90%, most preferably more than about 95%.

Despite the higher cationic activity of polyisoprene as compared to polybutadiene, the designing of preferred butyl slurry stabilizing agents based upon block copolymers with polyisoprene as the lyophobic "anchor" group is simpler than with similar block copolymers with polybutadiene as the lyophobic "anchor" group because crystallinity does not normally develop in hydrogenated polyisoprene. As 1,4 incorporated isoprene units are hydrogenated, rubbery ethylene/propylene copolymer sequences are formed; hydrogenation of 3,4 incorporated isoprene units yields 3,methylbutene-1 sequences and rubbery ethylene propylene 3,methylbutene-1 sequences and rubbery ethylene propylene 3,methylbutene-1 terpolymer sequences are formed from both 1,4 and 3,4 incorporated units. Therefore, even at very high hydrogenation levels, crystallinity is not a problem with a polyisoprene lyophobe. Thus there is no upper hydrogenation limit required in order to avoid crystallinity and preserve solubility with polyisoprene block copolymers and the highest achievable hydrogenation levels are generally preferred. With polyisoprene block copolymers, cationic activity is progressively diminished and performance as a butyl slurry stabilizer is progressively improved, both in a monotonic fashion, as hydrogenation level is progressively increased. Furthermore, the absence of crystallinity in the fully hydrogenated (ethylene/propylene copolymer) polyisoprene chain makes it unnecessary to build in other randomizing features as is necessary with polybutadiene. Nevertheless, the microstructure of the polyisoprene is a factor and should be as low in 3,4 content as is practical both because of the very high, undesirable, cationic activity of 3,4 isoprene moieties and because of the difficulty in fully hydrogenating enchained 3,4 isoprene sequences.

Those skilled in the art will also recognize that the teachings herein are generally applicable to the lyophilic/lyophobic class of stabilizing copolymers disclosed. For example, hydrogenation can also be used to improve the performance of other styrene/diene block and graft copolymers as slurry stabilizers. In particular, hydrogenated block copolymer stabilizers whose performance would be improved include styrene/cyclopentadiene, styrene/piperylene, styrene/dimethyl butadiene, etc. As with the polyisoprene or polybutadiene block copolymers the preferred hydrogenation level for these other styrene/diene block copolymers would have to be determined experimentally. With many though, as with polyisoprene, complete, or essentially complete hydrogenation of the diene would probably be acceptable and preferred since solubility limiting crystallinity would not devleop with many of these other diene blocks. As already indicated, if the diene block is either polyisoprene or a mixed isoprene/butadiene block, then crystallinity does not develop during hydrogenation because an ethylene/propylene rubbery block is formed by hydrogenation. With isoprene moieties in the diene chain, though, cationic activity is much higher than with 1,4 butadiene moieties so a very high degree of hydrogenation is necessary to avoid the formation of gel in the butyl polymer produced.

Hydrogenation can also be used to improve the performance of styrene/diene block copolymers in which the diene block is a copolymer chosen to have the correct solvency properties and desirable anchoring to the butyl particle surface. Thus the lyophobic block could be a copolymer of butadiene with a small amount of isoprene, styrene, etc. to provide randomization and prevent crystallinity development during hydrogenation without adversely affecting other properties. Suitably randomized lyophobic blocks can be fully hydrogenated without risk of crystallinity induced insolubility.

The process of the present invention offers a number of significant advantages resulting from the achievement of a stabilized butyl rubber slurry. These include elimination of reactor equipment fouling and plugging, the ability to operate at higher slurry concentrations, increased reactor production rates, the capability of refrigeration recovery by heat exchange of reactor effluent with incoming reactor feed, increased reactor run length time as well as the ability to polymerize at warmer reactor temperatures.

Another embodiment of the present invention comprises stabilized slurries of isoolefin homopolymers or butyl rubber copolymer, prepared in accordance with the present invention, containing up to about 50% by weight isoolefin homopolymer or butyl rubber copolymer; particularly a stabilized slurry of isobutylene-isoprene butyl rubber in methyl chloride, said slurry containing up to about 50% by weight butyl rubber, or a slurry containing up to about 50% by weight polyisobutylene.

A further embodiment of the present invention is a novel method of preparing non-agglomerating homopolymers of $C_4$-$C_7$ isoolefins and butyl rubber copolymers by polymerizing the corresponding monomers in the presence of a Lewis Acid cationic polymerization catalyst in a polymerization diluent selected from the group consisting of methyl chloride, methylene chloride, vinyl chloride and ethyl chloride in the presence of a stabilizer, the stabilizer being a preformed copolymer having a loyphilic, diluent soluble portion and a lyophobic diluent insoluble but isoolefin or butyl rubber soluble or adsorbable portion wherein the improvement comprises utilizing as said preformed copolymer stabilizing agent an hydrogenated block copolymer wherein cationically active unsaturation initially present in said stabilizing agent has been reduced and stabilizing effectiveness has been increased by said hydrogenation.

A particular point of novelty is the capability of forming non-agglomerating isoolefin homopolymer or butyl rubber copolymer at temperatures of from about $-90°$ C. to about $-20°$ C. utilizing $AlCl_3$ as well as other cationic Lewis Acid polymerization catalysts such as aluminum alkyls, as exemplified by aluminum ethyldichloride, $TiCl_4$, $BF_3$, $SnCl_4$, $AlBr_3$ and other Friedel-Crafts catalysts.

A particularly preferred embodiment of the present invention resides in the preparation of non-agglomerating isobutylene-isoprene butyl rubber by cationic polymeriztion of the corresponding monomers at temperatures of from about $-90°$ C. to $-20°$ C. utilizing as the catalyst $AlCl_3$ or aluminum ethyl dichloride in methyl chloride, methylene chloride, ethyl chloride or vinyl chloride diluent utilizing the stabilizer polymers of the present invention. Heretofore, it has simply not been possible to prepare non-agglomerating butyl rubber at temperatures warmer than about $-90°$ C. Furthermore, maintenance of a stable polymerization slurry at such temperatures enables the use of a wide variety of catalysts other than AlCl₃ to become practicable.

The effectiveness of partial hydrogenation in improving the performance of block copolymers as slurry stabilizers for butyl rubber and polyisobutylene polymerization slurries is illustrated by the following non-limiting examples. These examples show that the desired end result of producing an effective slurry stabilizer can be achieved in many ways provided basic requirements are met. These requirements include having preferred compositional and molecular weight ranges; having an hydrogenation level sufficiently high to eliminate objectionable cationic activity so that a gel-free butyl product is achieved; providing sufficient randomization in the hydrogenated lyophobic portion of the chain so that crystallinity is sufficiently low that suitable solubility properties are retained; achieving a proper anchoring to the polymerized particle surface; and obtaining a desirable system equilibrium (e.g., between the unimer, the micelloraggregates and the adsorbed species so that the required flow of stabilizer from the micelles to the new particle surface occurs). It will be observed that all of these factors do not operate as independent variables, so that modification of one can bring about changes in others. However, hydrogenation is shown to be a significant method for achieving improved slurry stabilizer performance.

EXAMPLE 1

A laboratory screening test has been developed for preliminary evaluation of slurry stabilizer performance. It consists of measuring the quality of the dispersion produced by shaking together 60 g of polyisobutylene with a $M_n$ of about 900 with 50 g of MEK containing 1 g of dissolved stabilizer in a 250 ml graduate. The quality of the dispersion is measured by observing the separation rate and further determined for the more stable dispersions by measuring particle size of the dispersion under a microscope. The beneficial effect of partial hydrogenation is shown below:

| Stabilizer Composition, Wt. % | $\overline{M}_v$ | % Butadiene Hydrogenated | Time to Initial Separation, min. |
|---|---|---|---|
| No stabilizer added | — | — | 0.5 |
| 58% Styrene/42% Butadiene Diblock | 47,000 | 0 | 4.5 |
| 58% Styrene/42% Butadiene Diblock | 47,000 | 30% | 1000 |
| 69% Styrene/31% Butadiene Diblock | 54,000 | 0 | 6 |
| 69% Styrene/31% Butadiene Diblock | 54,000 | 31% | 1000 |
| 75% Styrene/25% Butadiene Radial Diblock | 139,000 | 0 | 25 |
| 75% Styrene/25% Butadiene Radial Diblock | 139,000 | 0 | 25 |
| 75% Styrene/25% Butadiene Radial Diblock | 139,000 | 14 | 500 |
| 75% Styrene/25% Butadiene Radial Diblock | 139,000 | 49 | 1000 |
| 75% Styrene/25% Butadiene Radial Diblock | 139,000 | 66 | 1000 |
| 75% Styrene/25% Butadiene Radial Diblock | 139,000 | 80 | 1000 |
| 75% Styrene/25% Butadiene Radial Diblock | 139,000 | 98 | 0.5 |
| 70% Styrene/30% Butadiene Taper Diblock | 140,000[a] | 0 | 0.5 |
| 70% Styrene/30% Butadiene Taper Diblock | 140,000[a] | 58 | 90 |

[a]See Example 4B for further discussion.

The data show that although there were wide differences in the stabilizing effectiveness of the various styrene/butadiene resins evaluated, partial hydrogenation significantly improved effectiveness in all cases. As noted earlier, hydrogenation can be carried too far, resulting in the stabilizer becoming insoluble and ineffective (75/25 styrene/butadiene radial diblock with 98% butadiene hydrogenated).

A "taper" diblock is one in which there is a gradual transition from one pure block to the other with some random copolymer of changing composition in between. This occurs when anionic polymerization is initiated with a mixed diene/styrene monomer feed as compared to the polymerizaion method in which the second monomer is withheld until after the first has been consumed. With a mixed butadiene/styrene feed, the butadiene will be polymerized preferentially but small amounts of random styrene units will be incorporated. As the butadiene is consumed and the remaining monomer feed enriches in styrene more and more styrene will be incorporated. Finally, when the butadiene is all consumed, the remaining polystyrene will be polymerized. The resulting taper block polymer will then start out as nearly pure polybutadiene, have a central portion with increasing amounts of styrene in a random butadiene/styrene copolymer and end with an essentially pure polystyrene block.

A "radial" polymer is one in which 3 or more arms fan out from a central point. It is also often referred to as a "star" polymer in the literature. Radial polymers are normally produced by using a multifunctional coupling agent to couple a diblock polymer so that a number of diblock arms are attached to the coupling agent molecule. If N is the functionality of the coupling agent, then it is possible to attach N arms to it to form an N arm radial or star polymer.

EXAMPLE 2

A series of batch butyl polymerizations were made in order to further ascertain and demonstrate the influence of hydrogenation on the performance of styrene/butadiene block copolymers as slurry stabilizers for butyl polymerization slurries. The batch polymerizations were conducted in a nitrogen purged dry box containing a stirred, temperature-controlled bath. The bath was filled with 2-methyl pentane as a heat transfer fluid and cooled by liquid nitrogen. In conducting the batch polymerization trials a butyl rubber feed blend was prepared and divided into aliquots in 500 ml stirred polymerization reactors. The stabilizer under test was dissolved in the feed aliquot in the 500 ml reactor while stirring and cooling it by immersion in the temperature-controlled 2-methyl pentane bath. Catalyst solution was fed dropwise to initiate polymerization while continuing to stir at the controlled temperature. After the desired amount of polymer had been formed, the reaction was quenched by adding 25 ml of cold methyl isobutyl ketone (MIBK) and then the reactor was transferred to a hood and allowed to warm slowly with stirring. If the slurry was stable, additional MIBK was added as the methyl chloride boiled off so that a stabilized slurry of butyl rubber in MIBK was produced for examination and then recovery at room temperature.

The copolymer resins evaluated in the series of runs of this example were styrene/butadiene block copolymers sold commercially as KRO1-K-Resin ® by Phillips Chemical Company. The copolymer hereafter referred to as KRO1-K, is a block copolymer containing about 62 mole % styrene and 38 mole % butadiene. It has a viscosity average molecular weight of about 140,000 ($\overline{M}_n$=103,524, $\overline{M}_w$=165,683 by gel permeation chromatography, GPC, using polystyrene calibration standards). The polybutadiene lyophobic portion of this copolymer forms the central portion of the chain, surrounded by polystyrene lyophilic blocks. The polybutadiene microstructure is about 12% 1,2 and 88% 1,4 (mixed cis and trans configuration). The partially hydrogenated versions of this same resin were prepared using the procedures outlined in Example 3. Each feed aliquot in the 500 ml reactors consisted of 460 g of feed containing 48.5 g isobutylene, 1.5 g isoprene, and 410 g methyl chloride. In the control run A, no slurry stabilizer was added; in Run B 0.5 g KRO1-K was added as slurry stabilizer; in Run C 0.5 g of a partially hydrogenated KRO1-K (in which 85% of the unsaturation in the polybutadiene blocks had been hydrogenated chemically using diisobutyl aluminum hydride as the reducing agent) was added as slurry stabilizer. Run D utilized the fully hydrogenated copolymer. The reactors were immersed in a bath controlled at −65° C. and stirred in order to dissolve the stabilizers. Polymerization was initiated by dripping in a catalyst solution consisting of 0.5% ethyl aluminum dichloride in methyl chloride also at a temperature of −65° C.

The stabilizers were all added to the feed aliquots as fine powders; the KRO1-K used in run B and the 85% hydrogenated KRO1-K used in Run C both dissolved readily and completely in the feed aliquots after only a few minutes stirring and gave clear feed solutions. The fully hydrogenated KRO1-K used in Run D would not dissolve in the feed aliquot to any significant degree even after prolonged stirring so that eventually this polymerization had to be conducted with this stabilizer simply dispersed in the feed aliquot as fine particles. Other experiments showed that this fully hydrogenated resin could not be kept in solution in methyl chloride even by heating it in a bomb with methyl chloride to effect solution and then recooling. Even after prolonged heating and shaking in a bomb with methyl chloride the fully hydrogenated resin was not in solution when the bomb was cooled to remove the contents for observation. The resin was simply dispersed in the methyl chloride as fine particles; it was only very sparingly soluble or insoluble in cold methyl chloride.

The 0.5% ethyl aluminum dichloride catalyst solution in methyl chloride was allowed to drip into the stirred cooled reactors at a slow enough rate that reactor temperature was maintained between −64° and −56° C. After sufficient polymer had been formed, the reaction was quenched by adding 25 ml of cold methyl isobutyl ketone (MIBK) and then the reactor was transferred to a hood where it was allowed to warm slowly with stirring. Cold MIBK was added as the methyl chloride and unreacted monomers flashed off. A total of 200 ml of MIBK was added and then the resulting slurry in MIBK at room temperature was examined for stability before the polymer and extractable stabilizer were recovered for analyses.

In the control Run A with no added slurry stabilizer a total of 12 ml of the 0.5% ethyl aluminum dichloride catalyst solution was added to achieve 98.8% conversion of monomers to polymer. Since the polymerization was conducted at a temperature above Tg of the butyl, the slurry was very unstable and agglomerated completely as produced. It was transferred to the hood as a solid mass of butyl in clear methyl chloride; there was no slurry and it could not be stirred so no attempt was made to add MIBK as the methyl chloride flashed off. In Run D with 0.5 g of the fully hydrogenated KRO1-K added as a stabilizer (but present as dispersed powder and not in solution) 8 ml of the 0.5% ethyl aluminum dichloride catalyst solution was added to achieve 81.8% conversion of monomers to polymer and the result was almost exactly the same as in Run A. The slurry was very unstable and agglomerated completely as produced; it was also transferred to the hood as a solid mass of butyl in methyl chloride and it could not be stirred. Nevertheless, MIBK was added as the methyl chloride flashed off because it was desired to try to extract the stabilizer if possible. At room temperature there remained a completely agglomerated mass of butyl rubber in MIBK. The stabilizer was also not soluble in the MIBK and so none was extracted into the MIBK.

In Runs B and C with the KRO1-K and the 85% chemically hydrogenated KRO1-K respectively as stabilizers the results were quite different. In both these runs, the slurry stabilizers were effective and stable slurries were produced during polymerization which survived warming to room temperature and replacement of the methyl chloride with MIBK without massive agglomeration. In Run B with 0.5 g of KRO1-K as stabilizer, 13 ml of the 0.5% ethyl aluminum dichloride catalyst solution was added to achieve 76% conversion of monomer to polymer and a stable fluid milky slurry was produced. This slurry remained stable during quenching and also remained stable during warming in the hood and replacement of the methyl chloride with MIBK. At room temperature the butyl polymer was still present as a stable fluid milky slurry in MIBK. Most particles were too fine to see with the eye but there were a few up to ∼1 mm. Under the microscope, most particles seemed to be in the 3 to 10$\mu$ size range. The polymer was recovered by allowing the slurry to settle and decanting off the MIBK and then reslurrying twice in MEK and settling and decanting to remove as much of the soluble KRO1-K as possible. Stable dispersions resulted each time in the MEK. Methanol was then added to the settled slurry after the final MEK decant and it agglomerated into a mass which was kneaded in methanol to wash it and it was then vacuum oven dried. The combined MIBK and MEK extracts from decanting were concentrated by evaporation and then methanol was added to precipitate the extracted stabilizer and it was recovered by vacuum filtration and then vacuum oven dried. In Run C with 0.5 g of the 85% hydrogenated KRO1-K as stabilizer, 12 ml of the 0.5% ethyl aluminum dichloride catalyst was added to achieve 87% conversion of monomers to polymer. A stable fluid milky slurry was produced which remained stable during quenching and warming and replacement of the methyl chloride with MIBK. At room temperature, a stable fluid milky slurry of butyl rubber in MIBK persisted and all particles were too fine to see. Under the microscope the particles were nearly all <1μ and the slurry had to be further diluted with MEK to get it to settle at all so that the decanting steps could be done to extract the soluble partially hydrogenated KRO1-K. The butyl polymer and extracted stabilizer were recovered as above.

This work shows that the KRO1-K and the chemically partially hydrogenated KRO1-K were both effective stabilizers whereas the fully hydrogenated material was insoluble in the feed and ineffective. Furthermore, the partially hydrogenated KRO1-K was more effective than the original material as shown by the finer and more stable.

The butyl polymers recovered from all four runs were gel free and of about the same viscosity average molecular weight of 225,000. All of the partially hydrogenated KRO1-K was recovered from Run C by the extraction procedure, whereas only about 50% of the charged KRO1-K was recovered from Run B by the extraction procedure. The recovered stabilizer from Run B was of higher molecular weight than the KRO1-K originally charged and contained about 30% butyl rubber with it. The original KRO1-K was showing some cationic activity and becoming partially attached to the butyl during polymerization, whereas, the partially hydrogenated resin was not participating in the polymerization to any measurable extent. These data show that partial hydrogenation eliminated cationic activity and improved effectiveness of this styrene/butadiene block copolymer as a slurry stabilizer for butyl polymerization slurries. Complete hydrogenation on the other hand made the resin insoluble in methyl chloride and eliminated its usefulness as a stabilizer.

EXAMPLE 3

The partially hydrogenated styrene/butadiene block copolymers of this invention can be prepared by any of a variety of procedures. Appropriate hydride reducing agents can be employed or various catalytic hydrogenation methods can be used. It is important though, that reagents and conditions be chosen to achieve the desired degree of hydrogenation of the polybutadiene block without excessive hydrogenation of the polystyrene block or excessive degradation and/or cross-linking and branching of the block copolymer.

It is likewise important that the block copolymer, the reagents, and conditions be chosen such that all the basic requirements for a good stabilizer are met. These include: (1) choosing a block copolymer of the preferred styrene content, molecular weight, and structure; (2) achieving an hydrogenation level sufficiently high to eliminate objectionable cationic activity in the hydrogenated lyophobe so that a gel-free butyl product is produced; (3) achieving sufficient randomization in the hydrogenated lyophobic portion of the chain such that crystallinity is avoided and suitable solubility properties are attained; (4) producing an hydrogenated lyophobic portion of the chain which achieves proper anchoring to the butyl particle surface and (5) producing an hydrogenated block copolymer which exhibits a desirable equilibrium between the "unimer", the micellor aggregates, and the butyl surface adsorbed species under butyl polymerization conditions.

Examples of appropriate hydride reducing agents are diimide prepared in situ by decomposition of p-toluenesulfonyl-hydrazide or diisobutyl aluminum hydride. Examples of heterogeneous catalysts useful for catalytic hydrogenation are: platinum, palladium, or rhodium on various supports; or various forms of promoted and supported nickel or forms of Raney nickel. Examples of homogeneous catalysts useful for catalytic hydrogenation are: various soluble complexes of nickel, rhodium, irridium, platinum, osmium, iron, or ruthenium and various nickel or cobalt carboxylates in conjunction with lithium or aluminum alkyls. A few typical, but non-limiting, examples of hydrogenation reactions are summarized below:

A. Partial hydrogenation with diisobutyl aluminum hydride.

A styrene/butadiene block copolymer, KRO1-K, was used as the base styrene/butadiene resin for hydrogenation in these examples. The resin was vacuum oven dried to remove moisture and then dissolved in toluene (which had been dried over $CaH_2$ and distilled) to give a 10% solution of the KRO1-K in toluene. The solution was prepared and stored under dry nitrogen and the hydrogenation reaction was run in a dry nitrogen atmosphere to eliminate interference from air or water vapor. Hydrogenation was accomplished by adding the desired amount of diisobutyl aluminum hydride as a 25% solution in toluene to the 10% resin solution at room temperature and then stirring and heating to the desired temperature and for the desired period of time to effect partial hydrogenation. After the desired degree of completion of the hydrogenation reaction, the solution was cooled to at least 60° C. and then quenched with a molar excess of isopropanol (4 moles per mole diisobutyl aluminum hydride added). The quenched solution was heated to 80° C. to complete the quenching reaction and then recooled to 60° C. before stirring in a dilute aqueous HCl solution to hydrolyze the remaining aluminum complexes. The partially hydrogenated resin was recovered by washing to remove aluminum residues and then precipitating in methanol and vacuum oven drying. Typical reaction conditions to achieve various amounts of hydrogenation are summarized in the following table:

| PARTIAL HYDROGENATION WITH DIISOBUTYL ALUMINUM HYDRIDE (DIBAL H) | | | | |
|---|---|---|---|---|
| MOLES DIBAL H MOLE BUTADIENE | REACTION TEMPERATURE °C. | REACTION TIME, MIN. | % POLYBUTADIENE, HYDROGENATED | $\bar{M}_v$ |
| .25 | 60° C. | 60 | Trace Only | 141,000 |
| .50 | 60° C. | 120 | 14% | 149,000 |
| .25 | 90° C. | 60 | 57% | 147,000 |
| .50 | 90° C. | 120 | 72% | 160,000 |
| .75 | 90° C. | 120 | 83% | 145,000 |

PARTIAL HYDROGENATION WITH DIISOBUTYL ALUMINUM HYDRIDE (DIBAL H) -continued

| MOLES DIBAL H MOLE BUTA- DIENE | REACTION TEMPERA- TURE °C. | REACTION TIME, MIN. | % POLYBUTA- DIENE,HYDRO- GENATED | $\overline{M}_v$ |
|---|---|---|---|---|
| 1.0 | 90° C. | 120 | 85% | 149,000 |

No measurable hydrogenation of the polystyrene was observed under any of these conditions and, provided quenching and hydrolysis are done properly, little change in block copolymer molecular weight is experienced. The data show that the extent of butadiene hydrogenation is easily controlled by varying reaction conditions.

B. Catalytic hydrogenation with cobalt II octoate/triethyl aluminum.

(1) Catalytic hydrogenation of KRO1-K

The same starting resin of part A was also catalytically hydrogenated using a cobalt II octoate/triethyl aluminum catalyst system and hydrogen gas under pressure. Hydrogenation was conducted as follows: The vacuum oven dried resin was dissolved in cycohexane or toluene which had been dried over 5A mole sieve to give a 13% solution of resin in dry solvent. The desired amount of triethyl aluminum was charged as a 25% solution in hexane and then the desired amount of cobalt octoate was charged as a 12% cobalt solution and mixed in. All manipulations were in dry nitrogen atmosphere to exclude air and moisture. The reaction mixture was charged to a rocker bomb which was pressured with hydrogen gas and heated while rocking to effect hydrogenation. Hydrogen pressure was maintained in the bomb during reaction. After the desired reaction time, the bomb was cooled, depressured and an excess of isopropyl alcohol in cyclohexane was added as a quench. The hydrogenated resin was recovered by washing to remove catalyst residues and then precipitating in methanol and vacuum oven drying. Typical reaction conditions are summarized in the following table:

(~12%, 1,2) the apparent molecular weight increases with percent hydrogenation and the fully hydrogenated resin is insoluble in toluene at ambient conditions because of crystallinity. It is shown in later examples that these catalytically hydrogenated resins are not desirable butyl slurry stabilizers because this crystallinity develops before the undesirable cationic activity is eliminated. Some additional form of randomization must be introduced into the hydrogenated polybutadiene chain in order to prevent this polyethylene crystallinity from developing after hydrogenation.

(2) Catalytic hydrogenation of higher vinyl content butadiene/styrene block copolymer In order to prepare a more random hydrogenated polybutadiene block without crystallinity and with desirable solubility characteristics, a styrene/butadiene block copolymer was prepared and hydrogenated in which the amount of 1,2 incorporated units in the polybutadiene block was increased to 37%. This change in the polybutadiene microstructure is easily accomplished by adding an appropriate amount of a base such as THF (tetrahydrofuran) or TMEDA (N,N,N',N'-Tetramethylenediamine) to the hydrocarbon diluent (cyclohexane) in which the living anionic polymerization is effected. The block copolymer prepared for this series of experiments was 50 mole % styrene and 50 mole % butadiene with a viscosity average molecular weight of 121,000. It was a 4-arm star polymer with the polystyrene blocks on the outside and the polybutadiene blocks in the central position. The polybutadiene microstructure was 37%, 1,2; 32% trans 1,4; and 31% cis 1,4.

The desired block copolymer was dissolved as a 13% solution in cyclohexane or toluene which had also been

CATALYTIC HYDROGENATION OF KRO1-K HYDROGENATION REACTION CONDITIONS

| Moles Cobalt/ Mole Butadiene | Moles Aluminum/ Mole Cobalt | Hydrogen Pressure KPa | Reaction Temp. °C. | Reaction Time Min.* | RESIN PROPERTIES | |
|---|---|---|---|---|---|---|
| | | | | | Polybutadiene Hydrogenated, % | $\overline{M}_v$ |
| (1) .05 | 4.0 | 750 | 85 | 60 (a) | (1) 36 | 149,000 |
| (2) .05 | 4.0 | 750 | 85 | 120 (b) | (2) 50 | 166,000 |
| (3) .05 | 4.0 | 800 | 90 | 150 (a) | (3) 75 | 190,000 |
| (4) .05 | 4.0 | 800 | 85 | 75 (a) | (4) 100 | Insoluble in Toluene |

*Solvent:
(a)cyclohexane
(b)toluene

Although catalyst activity is somewhat variable from run to run, it is nevertheless possible by proper choice of conditions and by sampling to determine the extent of hydrogenation to obtain the desired degree of hydrogenation of the polybutadiene without any measurable hydrogenation of the polystyrene. The data show though that with this polybutadiene microstructure dried over 5A mol sieve and then hydrogenated in a rocker bomb using Cobalt II octoate/triethyl aluminum as the catalyst as in example 3B1. Hydrogenation and recovery were accomplished as already outlined. Typical reaction conditions are summarized in the following table:

CATALYTIC HYDROGENATION OF HIGHER VINYL CONTENT BUTADIENE/STYRENE BLOCK COPOLYMER

| HYDROGENATION REACTION CONDITIONS | | | | | RESIN PROPERTIES | | |
| --- | --- | --- | --- | --- | --- | --- | --- |
| Moles Cobalt/ Mole Butadiene | Moles Aluminum/ Mole Cobalt | Hydrogen Pressure KPa | Reaction Temp. °C. | Reaction Time Min.* | Polybutadiene Hydrogenated, % | % 1,2 Unsat. Left | $\overline{M}_v$ |
| .05 | 4.0 | 1600 | 100 | 120 (b) | 33 | 8 | 115,000 |
| 0.05 | 4.0 | 750 | 85 | 180 (b) | 58 | 1 | 115,000 |
| 0.075 | 4.0 | 1600 | 100 | 180 (a) | 71 | 0 | 114,000 |
| 0.05 | 4.0 | 700 | 85 | 120 (a) | 82 | 0 | 119,000 |
| 0.075 | 4.0 | 2200 | 110 | 420 (a) | 100 | 0 | ** |

*Solvent:
(a)cyclohexane
(b)toluene
**Not completely soluble in toluene.

No measurable polystyrene hydrogenation occurred under any of these conditions. Although catalyst activity is somewhat variable, it is possible to obtain any desired degree of hydrogenation by sampling to monitor the progress of the hydrogenation. The data show the high selectivity of this hydrogenation technique with nearly complete saturation of the 1,2 butadiene units being achieved at less than 60% total hydrogenation. With the degree of randomization imparted by this microstructure there is no apparent increase in molecular weight with hydrogenation level and the hydrogenated block copolymers remain fully soluble with no evidence of crystallinity until very high levels of hydrogenation are achieved. It is thus possible with this block copolymer and hydrogenation technique to produce a desirable butyl slurry stabilizer—undesirable cationic activity can be eliminated before undesirable crystallinity develops. The effectiveness of these partially hydrogenated block copolymers as slurry stabilizers is illustrated in later examples.

The above reactions illustrate conditions under which the partially hydrogenated styrene/butadiene resins of this invention can be prepared. Persons skilled in the art can accomplish the desired hydrogenation using other reducing agents, catalysts, and conditions, including continuous hydrogenation procedures, within the scope of this invention.

EXAMPLE 4

Batch polymerizations similar to those described in Example 2 were run with other styrene/butadiene block copolymers to further demonstrate the beneficial effects of chemical partial hydrogenation on the performance of these resins as slurry stabilizers for butyl polymerization slurries.

A. Styrene/Butadiene Radial Block Copolymer

Batch polymerizations were run as in Example 2 to evaluate a styrene/butadiene radial block copolymer (KRO3-K-Resin® manufactured by Phillips Chem. Co.) and a chemically partially hydrogenated version of it as a slurry stabilizer. It is similar to KRO1-K, but synthesized using a different coupling agent, and produced with a different molecular weight and molecular weight distribution. It contains 62 mole % styrene and 38 mole % butadiene with a viscosity average molecular weight of 145,000 ($\overline{M}_n$=98,500; $\overline{M}_w$=213,100 by GPC). A feed blend was prepared as in Example 2 and divided into aliquots in 500 ml. reactors; each aliquot consisted of 48.5 g isobutylene, 1.5 isoprene, and 410 g methyl chloride. In the control Run 1, no slurry stabilizer was added; in Run 2 0.5 g of KRO3-K was added as slurry stabilizer; and in Run 3 0.5 g of a chemically partially hydrogenated KRO3-K in which 85% of the unsaturation in the polybutadiene portions had been hydrogenated, was added as slurry stabilizer. The partial hydrogenation was accomplished as in Example 3A with diisobutyl aluminum hydride as the reducing agent so that some cyclization occurs during hydrogenation to introduce randomization and prevent crystallinity formation. The stabilizers were added as fine powder and stirred into the feed at −65° C.; both stabilizers dissolved completely within a few minutes to give a clear feed solution. Polymerization was initiated by feeding a 0.18% aluminum chloride solution in methyl chloride dropwise while stirring and cooling the reactor; catalyst solution was fed slowly enough to permit maintaining reactor temperature between −64° and −56° C. The reaction was quenched, allowed to warm with stirring in a hood and, as the methyl chloride flashed off, it was replaced by MIBK (where possible), and the product examined and recovered as in Example 2.

In the control Run 1 with no added stabilizer 13 ml of catalyst solution were added to achieve 86.9% conversion of monomers to polymer and the final recovered polymer had an INOPO of 8.5 and $\overline{M}_v$=245,700. (INOPO is a standard test for measuring unsaturation in isoprene butyl rubber. It is also referred to as the drastic Iodine-Mercuric Acetate method; see I.E.C. 17 367 (1945)). The butyl agglomerated completely during polymerization to form a large mass of polymer and no slurry at all; it could not be stirred in the hood so no MIBK was added as the methyl chloride flashed off. In Run 2 with 0.5 g KRO3-K added as slurry stabilizer 17 ml of catalyst solution were required to achieve 88.1% conversion of monomers to polymer. A stable slurry which appeared as a fluid milk was produced in the reactor and survived quenching and transfer to the hood with little change. During warming and replacement of the methyl chloride with MIBK some agglomeration and particle growth occurred but the butyl polymer remained dispersed as a fluid milky dispersion. At room temperature the butyl was dispersed in the MIBK as a stable particulate dispersion while stirring but settled quickly to a clear supernatant liquid when stirring was stopped. The butyl particles ranged in size from about 1 mm to 10 mm and readily redispersed when stirring was restarted. The KRO3-K had effectively stabilized the butyl slurry during polymerization and imparted sufficient stability to survive warming to room temperature and replacement of the methyl chloride with MIBK without massive agglomeration. The butyl polymer and extractable stabilizer were recovered as outlined in Example 2. The butyl polymer had an INOPO of 9.0 and an $\overline{M}_v=274,400$. A weight of material was extracted from the butyl equal to 140% of the weight of KRO3-K charged and analyses showed that it was not the same as the starting KRO3-K; it contained more than 30% of butyl chemically attached to the extractable resin and was higher in molecular weight than the original KRO3-K. These extractability results along with the fact that the butyl rubber produced in this run had a higher molecular weight and INOPO than the control run indicate that the KRO3-K was participating in the polymerization to some extent. It was also having an adverse effect on catalyst efficiency; 17 ml of catalyst were required in this run to produce about the same amount of polymer as 13 ml in the control run. In Run 3 with 0.5 g of 85% chemically hydrogenated KRO3-K added as slurry stabilizer, 12 ml of catalyst solution were required to achieve 62% conversion of monomers to polymer and an extremely stable fluid milky slurry was produced in the reactor. This slurry survived quenching, warming to room temperature, and replacement of the methyl chloride with MIBK with no visible agglomeration. At room temperature the butyl polymer was still present as a stable fluid milky dispersion in MIBK with the particles too fine to see. Under the microscope most particles were in the 2 to 3 micron size range with a few as large as 20 to 30 microns. Clearly the chemically partially hydrogenated KRO3-K was a much more effective stabilizer than the original KRO3-K. The butyl polymer and extractable stabilizer were recovered as in Example 2. The butyl polymer had an $\overline{M}_v=250,200$ and INOPO of 8.5. The extracted stabilizer was identical to the added hydrogenated KRO3-K. Hydrogenation of 85% of the polybutadiene unsaturation had diminished the cationic activity of the resin sufficiently so that under the polymerization conditions used, the resin was not participating in the polymerization to any appreciable degree. As in Example 2 with the KRO1-K partial hydrogenation of the KRO3-K improved its performance as a slurry stabilizer and eliminated the undesired cationic activity.

B. Styrene/Butadiene Linear Taper Block Copolymer

A series of batch polymerization runs similar to those described in Example 2 were run to evaluate a styrene/butadiene linear taper block copolymer (Solprene®314D, manufactured by Phillips Chem. Co.) and a chemically partially hydrogenated version of it as a slurry stabilizer. Solprene 314D is a linear taper block styrene/butadiene copolymer with an $\overline{M}_v=140,000$ and it contains about 70 wt. % styrene. The chemically partially hydrogenated version of this copolymer had 58% of the unsaturation in the polybutadiene portion saturated by hydrogenation using diisobutylene aluminum hydride as in Example 3A. A feed blend was prepared as in the previous examples and divided into aliquots in 500 ml reactors with each aliquot containing 48.5 g isobutylene, 1.5 g isoprene, and 410 g methyl chloride. In the control Run 1 no slurry stabilizer was added; in Run 2 0.5 g of Solprene 314D was added as slurry stabilizer; and in Run 3 0.5 g of the 58% chemically hydrogenated Solprene 314D was added as a slurry stabilizer. The stabilizers were added as fine powders and stirred into the feed at $-65°$ C.; they dissolved completely within a few minutes. (The stabilizers were prepared in powder form by dissolution in toluene, precipitation in methanol followed by vacuum oven drying). Polymerization was initiated by dropwise addition of a 0.5% ethyl aluminum dichloride in methyl chloride catalyst solution while stirring and maintaining reaction temperature between $-64°$ and $-56°$ C. The evaluation of slurry stability and recovery of polymer and extractable stabilizer was done as in the previous examples.

In control Run 1 with no added stabilizer, 7 ml of catalyst solution achieved 75% conversion of monomers to polymer and the final recovered butyl polymer had an INOPO of 8.6 and $\overline{M}_v=200,300$. The butyl agglomerated completely during polymerization to form a large mass of polymer with no slurry at all. In Run 2 with 0.5 g Solprene 314D added as slurry stabilizer, 5.6 ml of catalyst solution achieved 72.7% conversion of monomers to polymer. A fluid milky slurry which contained some visible agglomerates was produced in the reactor and survived quenching and transfer to the hood. During warming and replacement of the methyl chloride with MIBK some further agglomeration occurred but the butyl polymer still remained dispersed as a fluid dispersion; the Solprene 314D was acting as a slurry stabilizer and producing a markedly more stable dispersion than was achieved in the control run. At room temperature, the butyl was dispersed in the MIBK as a stable particulate dispersion while stirring but settled quickly to a clear supernatent liquid when stirring was stopped. The particles spanned a broad size range from barely visible up to ⅛" in diameter and readily redispersed when stirring was restarted. The butyl polymer was recovered and attempts made to extract the stabilizer as outlined previously. None of the stabilizer was recovered by extraction and the butyl polymer was highly gelled. It contained 33% gel by weight with the sol fraction having a molecular weight of 408,100. Clearly this copolymer was a less effective stabilizer and it was exhibiting an unacceptably high degree of cationic activity under these polymerization conditions. All of the Solprene 314D was becoming chemically bonded to the butyl during polymerization and much of it was becoming multiple-bonded to produce gel. In Run 3 with 0.5 g of the 58% chemically hydrogenated Solprene 314D as a slurry stabilizer, 6.5 ml of catalyst solution achieved 73.6% conversion of monomers to polymer and a fluid milky slurry was produced in the reactor and survived quenching and transfer to the hood. During warming and replacement of the methyl chloride with MIBK agglomeration occurred but the butyl polymer remained dispersed as a particulate dispersion as long as stirring was continued. Particles ranged in size up to ∼⅛" diameter and the slurry settled quickly when stirring was stopped. Polymer was recovered as usual. Again, no stabilizer was extractable; all had become bonded to the butyl polymer. The butyl polymer contained 11% gel with the sol fraction having a molecular weight of 296,500. Partial hydrogenation had reduced the cationic activity so that less gel was produced, but 58% hydrogenation was not sufficient to eliminate the undesirable cationic activity of Solprene 314D under these polymerization conditions. A higher degree of hydrogenation would undoubtedly have further reduced activity, but no further work was done with this copolymer since it was not as desirable a stabilizer as those previously described.

The apparent reason for the poorer performance of this taper block copolymer and its partially hydrogenated counterpart as compared to the block copolymers of the previous examples is that it is a taper block polymer and does not contain a high enough portion of block polystyrene to be a preferred butyl slurry stabilizer. While the overall composition of Solprene 314D is about 70 wt. % styrene and 30 wt. % butadiene, much of the styrene is incorporated in the polybutadiene taper block; the pure polystyrene block comprises only about 35 wt. % of the block copolymer. Preferred butyl slurry stabilizers contain more than about 45 wt. % polystyrene block content and most preferred stabilizers between about 60 and about 80 wt. % polystyrene block content.

C. Styrene/Butadiene Linear Diblock Copolymer Plus Butadiene

Since taper block polymers are not preferred butyl slurry stabilizers, a series of batch polymerization runs similar to those described in Example 2 A & B were run to evaluate an experimental diblock resin (prepared by sequential monomer addition) and a partially hydrogenated version of it as a slurry stabilizer. This experimental styrene/butadiene diblock copolymer was produced by first polymerizing a butadiene feed with secondary butyl lithium in cyclohexane to yield a "living" polybutadienyl lithium in solution and then adding a charge of styrene to it to continue the growth and produce the diblock copolymer. In theory, similar diblock copolymers can be prepared by polymerizing either monomer first, but in practice the diblock copolymers produced are somewhat different depending upon which monomer is polymerized first because the second monomer charge always has some impurities which results in some killing of the living chains of the first monomer and growth of the second monomer only on the remaining living chains. The killed chains of the first monomer end up as a homopolymer contaminant of the diblock copolymer. Thus when butadiene is polymerized first the diblock will be contaminated with some polybutadiene and when styrene is polymerized first the diblock will be contaminated with some polystyrene.

Of course, if it is desired to produce a linear triblock copolymer or radial block copolymer by coupling reactions then the order of monomer addition becomes even more important as it determines which block is at the center and which at the periphery of the coupled block copolymer. The monomer added last becomes the living block remaining at the end of the polymerization and hence it reacts with the coupling agent and becomes the central portion of the coupled polymer.

In this example with the butadiene polymerized first and the styrene charged as the second monomer, a block copolymer contaminated with polybutadiene homopolymer was produced. This experimental block copolymer, identified as 7887-75 (referred to as LD-75), is a linear diblock copolymer containing about 55 wt. % styrene with an $\overline{M}_v$ of about 110,000 and contaminated with about 13% butadiene homopolymer. The partially hydrogenated version of LD-75 resin had 81% of the butadiene unsaturation removed by chemical hydrogenation. A feed blend was prepared as in the previous examples and divided into aliquots in 500 ml reactors with each aliquot containing 48.5 g isobutylene, 1.5 g isoprene and 410 g methyl chloride. In the control Run 1 no slurry stabilizer was added; in Run 2 0.5 g of LD-75 was added as slurry stabilizer; in Run 3 0.5 g of the 81% chemically hydrogenated LD-75 was added as slurry stabilizer. The stabilizers were added to the cold feed aliquot as powders and stirred to dissolve. The stabilizers dissolved within a few minutes but the 81% hydrogenated LD-75 gave a somewhat turbid solution. Polymerization was initiated by feeding dropwise a 0.5% ethyl aluminum dichloride solution in methyl chloride while stirring and maintaining reactor temperature between $-64°$ and $-56°$ C. Evaluations were performed as previously described.

In control Run 1 with no added stabilizer, 7 ml of catalyst solution achieved 75% conversion of monomers to polymer and the final recovered polymer had an INOPO of 8.6 and an $\overline{M}_v=200,300$. The butyl agglomerated completely during polymerization to form a large mass with no slurry at all. In Run 2 with 0.5 g LD-75 as stabilizer, 6.5 ml of catalyst solution was required to achieve 68.0% conversion of monomers to polymer. A fluid milky slurry was produced in the reactor along with some larger agglomerated masses of polymer. Slurry appearance was approximately the same after quenching and transfer to the hood but extreme agglomeration and plating out on the walls and stirrer occurred during warming and replacement of the methyl chloride with MIBK. At room temperature essentially all the polymer had plated out on the reactor walls and stirrer or had agglomerated into several large masses. The LD-b 75 was stabilizing the slurry to some extent compared to the control but was not imparting sufficient stability under these conditions to survive warming to room temperature.

Attempts to extract the stabilizer were unsuccessful; none was extractable indicating that all had become bonded to the butyl polymer during polymerization. The recovered butyl polymer was also highly gelled. It contained 28% gel by weight with the sol fraction having an $\overline{M}_v=486,200$. The LD-75 resin was only a modestly effective stabilizer and it was exhibiting an excessive amount of cationic activity and causing large amounts of gel under the polymerization conditions used. In Run 3 with 0.5 g of the 81% chemically hydrogenated LD-75 resin as stabilizer, 6.5 ml of catalyst solution were required to achieve 70.6% conversion of monomers to polymer. A fluid milky slurry was produced in the reactor but agglomerated extensively during quenching and warming to room temperature. At room temperature much of the polymer had plated out on the walls and stirrer and the remainder was a very coarse dispersion with particles ~¼" in diameter. Even the hydrogenated LD-75 resin was not a very effective stabilizer. Polymer was recovered as usual. None of the stabilizer was extractable; all had become bonded to the butyl polymer during polymerization even at the 81% hydrogenation level. However, the recovered butyl polymer contained only 5% gel by weight and the sol fraction had an $\overline{M}_v=199,200$ (essentially equal to the control). Partial hydrogenation had improved performance and nearly completely eliminated the undesired cationic activity. However, the LD-75 resin was a less preferred stabilizer.

Apparently the LD-75 resin was a poorer stabilizer than the styrene/butadiene block copolymers (K-Resins) because of its structure and because of the presence of polybutadiene homopolymer. LD-75 is a simple diblock polymer whereas the K-Resins are more complicated block copolymers with 2 or more polystyrene end blocks and with the polybutadiene blocks comprising the central portion of the block copolymer. These block copolymers with two or more styrene end blocks ("multidiblock" copolymers) are preferred stabilizers compared to simple diblocks, whether in combination with a polybutadiene lyophobe or another, e.g., polyisoprene. Furthermore the polybutadiene homopolymer adversely affects performance because it apparently dissolves in the block copolymer micelles and stabilizes them in methyl chloride solution. Thus the desired flow of stabilizer from the micelle to the unimer to the butyl surface is impeded and less stabilizer is available to adsorb on the butyl; hence it is less effective.

The detrimental effects of polybutadiene homopolymer on effectiveness of a desirable block copolymer as a butyl slurry stabilizer was confirmed by contaminating a diblock polymer with some polybutadiene homopolymer; and the relatively innocuous effect of polystyrene homopolymer was also determined by contaminating a diblock polymer with some polystyrene homopolymer. The homopolymer contaminated diblock polymer was prepared by dissolving a 95/5 mixture of the diblock copolymer and the desired homopolymer contaminant in toluene to give a 10% polymer solution and then precipitating in methanol and collecting and vacuum oven drying the polymer blend. The diblock polymer used in these contaminant experiments was designated CHAI-99-3; it was a 100% hydrogenated linear diblock styrene/isoprene copolymer containing about 69 wt. % styrene with an $\overline{M}_v$ of 149,000. The homopolymer contaminants were low molecular weight polybutadiene and polystyrene both with an $\overline{M}_v$ of ~50,000.

To evaluate the effect of the homopolymer contamination, a feed blend was prepared and divided into 4 aliquots in 500 ml reactors exactly as in the previous example. In the control Run 1, no slurry stabilizer was added; in Run 2, 0.5 g of CHAI-99-3 (1% on monomers) was added; in Run 3, 0.5 g of the 95/5 blend of CHAI-99-3 with polybutadiene homopolymer was added; while in Run 4, 0.5 g of the 95/5 blend of CHAI-99-3 with polystyrene homopolymer was added. Batch polymerizations were initiated by dropwise addition of 0.5% ethyl aluminum dichloride solution in methyl chloride while stirring and maintaining reactor temperature between $-64°$ and $-56°$ C. Evaluations were performed as previously described. Results are summarized below:

EFFECT OF HOMOPOLYMER CONTAMINATION ON EFFECTIVENESS OF STYRENE/HYDROGENATED ISOPRENE DIBLOCK COPOLYMER AS BUTYL SLURRY STABILIZER

| Run | Stabilizer (1% on Monomers) | Appearance of Butyl Slurry in MIBK at R.T. |
|---|---|---|
| 1 | None (control) | Totally Agglomerated |
| 2 | CHAI-99-3 | Milk; <1-30; Avg. 5-10 microns |
| 3 | 95/5 CHAI-99-3-/Polybutadiene | Particulate Dispersion 1 mm-½" |
| 4 | 95/5 CHAI-99-3/Polystyrene | Milk; <1-30; Avg. 5-10 microns |

The results show that the polybutadiene homopolymer has a strong negative effect on performance as a slurry stabilizer whereas the polystyrene homopolymer has little, if any, effect. The detrimental effect of the methyl chloride insoluble polybutadiene homopolymer is believed to be due to its dissolving in the block copolymer micelles and stabilizing them. The polystyrene homopolymer being soluble in methyl chloride, has no effect on the micelles and simply acts as an inert diluent.

This result has important bearing in teaching the preferred method of preparing the block copolymers (i.e. styrene polymerization first) to avoid detrimental homopolymer contamination. Alternatively, the block copolymer could be purified following synthesis and before use as a slurry stabilizer. In general, contaminants which are insoluble in methyl chloride and compatible with the lyophobic block of the block copolymer must be avoided since the contaminants are able to stabilize the block copolymer micelles and interfere with the desired flow of stabilizer from micelle to unimer to the butyl surface.

These examples all show that partial hydrogenation is a generally applicable technique for improving the performance of, and reducing objectionable cationic activity of styrene/butadiene block copolymers as slurry stabilizers for butyl polymerization slurries. The technique is widely applicable to a wide range of resins but the extent of hydrogenation for the reduction of objectionable cationic activity and improvement of performance, is dependent upon resin structure and composition as well as on hydrogenation and polymerization conditions and is best determined experimentally using this disclosure and examples as guidelines.

EXAMPLE 5

In order to further demonstrate and define the beneficial influence of partial hydrogenation on the performance of styrene/butadiene block copolymers as slurry stabilizers for butyl polymerization slurries, a series of polymerization trials were run in a butyl pilot plant reactor. The pilot plant reactor was a small prototype of commercial butyl reactors and permitted polymerization experiments to be run under continuous polymerization conditions which closely simulated actual commercial polymerization conditions. The reactor was a modified, baffleddraft tube containing well-stirred tank type reactor of nominal, one gallon capacity and containing 2.86 square feet of heat transfer surface to remove the heat of polymerization and maintain the reactor at polymerization temperature. Separate feed and catalyst streams could be chilled and metered continuously into the reactor and the effluent was continuously overflowed through a ¾ inch line into chilled product slurry receivers for quenching and recovery. Reactor temperature was maintained and controlled by circulating a heat transfer fluid at a controlled temperature and rate through the reactor heat transfer surfaces.

A series of pilot plant runs were made to compare KRO3-K and a 50% chemically hydrogenated version of KRO3-K as slurry stabilizers under continuous steady-state conditions. The KRO3-K was dissolved in methyl chloride to yield a 1.67% solution of the resin in methyl chloride as one of the feeds to the reactor. A number of conditions were tried to establish an operable slurry concentration. Under the conditions used in this example, total feeds in grams per minute to the reactor were:

| | |
|---|---|
| Isobutylene | 55.27 |
| Isoprene | 1.53 |
| Methyl Chloride | 99.51 |
| KRO3-K | 0.73 |
| AlCl₃ | 0.045 |
| Total | 157.09 |

The stabilizer level was 1.3% on monomers and the slurry concentration about 34%. Reactor temperature was controlled at $-95°$ C. and the effluent was a yellow, very fine, fluid dispersion of butyl rubber particles.

Conversion of monomers to butyl was about 93%. The stabilizer was effective in maintaining fluidity and making heat transfer possible in the reactor at a much higher level than could be achieved in its absence. It was stabilizing the slurry just as in the batch run. However, it was evident that much gel was being produced in the reactor and the run had to be terminated after a few hours because of severe reactor fouling. Analyses showed that the butyl polymer being produced contained more than 50% gel and none of the KRO3-K could be extracted from it-all had reacted with the butyl product polymer extensively during polymerization to become chemically multiple-bonded to it to produce extensive gel. The reactor was also filled with an insoluble gel after the run and had to be disassembled and manually cleaned. Clearly, under the conditions in the continuous reactor, the KRO3-K was exhibiting excessive cationic activity so that large amounts of gel and reactor fouling were resulting from its use. It was stabilizing the slurry but would not be suitable for use under these conditions.

For a comparison series of runs with the partially hydrogenated KRO3-K, a 50% chemically hydrogenated KRO3-K was dissolved in methyl chloride to form a 2.06% solution of the partially hydrogenated resin in methyl chloride as one of the feeds to the reactor. Again a number of conditions were tried to establish an operable slurry concentration. At the conditions selected (although not necessarily optimum) total feeds in grams per minute to the reactor were:

| | |
|---|---|
| Isobutylene | 52.53 |
| Isoprene | 1.43 |
| Methyl Chloride | 92.58 |
| 50% Chemically Hydrogenated KRO3-K | 0.54 |
| AlCl$_3$ | 0.046 |
| Total | 147.13 |

The stabilizer level was 1.0% on monomers and the slurry solids nearly 37%. Reactor temperature was controlled at −95° and the effluent was a yellow, very fine, dispersion of butyl rubber particles in methyl chloride which turned to a white milk on quenching. The particles were all much too fine to see with the unaided eye. Conversion of monomers to polymer was about 99%. The stabilizer was effective in maintaining fluidity and permitting heat transfer at a higher slurry concentration than was possible with the unhydrogenated resin. The slurry was also of finer particle size and more stable and no reactor fouling was evident during this run. The butyl polymer being produced was gel-free with an $\overline{M}_v$=200,000 and an INOPO of 24. None of the stabilizer could be extracted from the butyl rubber. Apparently all had become chemically bonded to the butyl during polymerization, but multiple-bonding had not occurred and the butyl contained no detectable gel. The butyl unsaturation as indicated by INOPO was much higher than would normally be expected for a feed containing only 2.7% isoprene on isobutylene again indicating that the KRO3-K resin was bonded to the butyl.

These data show that under practical continuous polymerization conditions partial hydrogenation improved the performance of KRO3-K as a slurry stabilizer for a butyl polymerization slurry and reduced the cationic activity of the resin so that the formation of gel in the butyl rubber was prevented. These results are directionally similar to those demonstrated in the batch polymerization trials except that the tendency to form gel is much more under continuous polymerization conditions. With the hydrogenated resin, operable conditions with no fouling were achieved with a 37% slurry, whereas severe fouling was encountered with only a 34% slurry with the unhydrogenated resin. Furthermore a butyl polymer containing more than 50% gel resulted when the unhydrogenated resin was used, whereas a gel-free polymer resulted when the 50% hydrogenated resin was used. Clearly, partial hydrogenation is beneficial in improving the performance of styrene/butadiene block copolymers as slurry stabilizers.

EXAMPLE 6

Another series of pilot plant runs were made, as described in Example 5 to compare other unhydrogenated and partially hydrogenated styrene/butadiene block copolymers as butyl slurry stabilizers under continuous steady-state conditions. In all cases partial hydrogenation improved the performance of the resin as in the batch runs and also reduced or eliminated cationic activity of the resin as evidenced by gel-formation in the butyl product polymer and by extractability of the resin from the butyl. Results of a comparison series of pilot plant runs with KRO1-K and an 85% chemically hydrogenated version of this same resin as summarized below:

KRO1-K was dissolved in methyl chloride to yield a 2.51% solution of the resin in methyl chloride as one of the feeds to the reactor. A steady-state set of conditions was achieved with the following feeds into the reactor, all in grams per minute:

| | |
|---|---|
| Isobutylene | 52.38 |
| Isoprene | 1.41 |
| Methyl Chloride | 109.85 |
| KRO1-K-Resin | 0.40 |
| AlCl$_3$ | 0.048 |
| Total | 164.09 |

The stabilizer level was 0.75% on monomers and the slurry concentration about 31.5% (again much higher than could be sustained in the absence of a slurry stabilizer). Reactor temperature was controlled at −93.5° C. and the effluent was a very fluid yellow very fine dispersion of butyl rubber particles which turned into a white milk upon quenching; the particles were much too fine to see with the unaided eye. Conversion of monomer to polymer was about 95% and the reactor ran very smoothly with no evidence of fouling. The butyl polymer being produced has an $\overline{M}_y$ of 650,000 and an INOPO of 16.1 The polymer apparently contained some very tenuous gel which was present in samples taken directly from the reactor but was absent in samples taken after hot mill drying. None of the resin was extractable; all had become chemically bonded to the butyl polymer during polymerization and was apparently just on the verge of becoming multiple-bonded and forming gel. Runs made at a higher slurry concentration and/or higher stabilizer level resulted in the production of a gel-containing butyl produce and rapid reactor fouling. The KRO1-K performed satisfactorily as a stabilizer, without a marked tendency to form gel, but gel can, and did, result under some polymerization conditions. The INOPO of 16.1 with a feed containing only 2.7% isoprene on isobutylene also indicates the presence of chemically bound KRO1-K in the butyl.

In the comparison runs an 85% chemically hydrogenated KRO1-K was used. It was dissolved as a 1.96% solution in methyl chloride as one of the feeds to the reactor. A steady-state condition was achieved with the following feeds into the reactor, all in grams per minute:

| | |
|---|---|
| Isobutylene | 52.3 |
| Isoprene | 1.42 |
| Methyl Chloride | 89.60 |
| 85% Chemically Hydrogenated KRO1-K | 0.44 |
| AlCl$_3$ | 0.034 |
| Total | 143.80 |

The stabilizer level was 0.82% on monomers and the slurry solids about 37%. Reactor temperature was controlled at $-95°$ C. and the effluent was a fluid yellow milk which turned white on quenching; the particles were all too fine to see with the unaided eye and good heat transfer was achieved in the reactor indicating the slurry viscosity was quite low. Conversion of monomers to polymer was about 98% and the reactor ran well with no evidences of fouling. The butyl polymer being produced had an INOPO of 10.6 and an $\overline{M}_v$ of 302,000. Nearly all of the stabilizer was extractable and the polymer was gel-free. It had a normal INOPO for a feed with 2.7% isoprene on isobutylene.

As in all the previous examples, chemical partial hydrogenation using diisobutyl aluminum hydride improved the performance of the KRO1 resin as a slurry stabilizer (enabled operation at a higher slurry concentration) and reduced cationic activity of the resin (eliminated gel formation and resulted in the stabilizer being extractable from the butyl product polymer). The butyl produced with the hydrogenated resin also had a normal INOPO. Particularly good performance was evidenced by this partially hydrogenated KRO1-K. At less than 1% stabilizer on monomers it produced a very stable slurry which remained fluid and stable at very high slurry solids. Furthermore, the chemically partially hydrogenated KRO1-K had no tendency to produce gel under any polymerization condition tried and in fact, the resin was largely extractable from the product butyl polymer under most conditions. A preferred level of chemical partial hydrogenation of this type of copolymer is between 40 and 90% saturation of the original butadiene unsaturation, more preferably between about 50 and 85% saturation seems optimum for this resin.

EXAMPLE 7

An additional series of batch polymerizations similar to those described in Example 2 were run with the series of catalytically partially hydrogenated KRO1-K prepared in Example 3B1 in order to compare the catalytically partially hydrogenated KRO1-K with the chemically partially hydrogenated resins of the earlier examples. The resins used in this series of runs are identified in the following table.

| COPOLYMERS USED AS STABILIZERS IN BATCH RUNS | | | | |
|---|---|---|---|---|
| Stabilizer | Hydrogenation Method | % Hydrogenation | $\overline{M}_v$ | Appearance Of MeCl Solution (a) |
| KRO1-K | None | 0 | 140,000 | Clear |
| CHKRO1-III | Catalytic | 36 | 149,000 | Sl. Hazy |
| CHKRO1-VIII | Catalytic | 50 | 166,000 | Hazy, Sl. Milky |
| CHKRO1-IV | Catalytic | 75 | 190,000 | Hazy, Turbid |
| CHKRO1-I | Catalytic | 100 | (b) | Insoluble Dispersion |
| HKRO1-XIV | Chemical | 85 | 149,000 | V. Sl. Hazy, nearly Clear |

(a) 1% solution of stabilizer in methyl chloride at $-40°$ C.
(b) Insoluble in toluene.

The catalytic hydrogenations were effected using hydrogen gas in a rocker bomb with a Cobalt II ocotate/aluminum triethyl catalyst system as described in Example 3B whereas the chemical hydrogenation was accomplished using diisobutyl aluminum hydride as the reducing agent as described in Example 3A. In order to evaluate the resins as slurry stabilizers they were dissolved in methyl chloride in heated and shaken bombs at 70° C. and then chilled below the boiling point of methyl chloride and removed into glass traps in the dry box for observation and use in butyl polymerization runs. The appearance of the 1% solutions in methyl chloride at $-40°$ C. is indicated in the above table. The original KRO1-K and the 85% chemically hydrogenated KRO1-K were completely dissolved to give clear or very nearly clear solutions; whereas the catalytically hydrogenated KRO1-K became progressively less soluble as the degree of hydrogenation was increased. The 100% hydrogenated resin was completely insoluble and it simply dispersed in the methyl chloride when shaken and then resettled. The 75% hydrogenated resin formed a hazy, turbid solution which slowly settled a very milky particulate layer. The 50% hydrogenated resin was a hazy, slightly milky solution, while even the 36% hydrogenated resin was a hazy solution much less clear than the 85% chemically hydrogenated resin solution. There was a significant difference in solubility between the chemically and catalytically hydrogenated resins of this type with the chemically 85% hydrogenated resin being more soluble than even the 36% catalytically hydrogenated resin. This solubility difference is caused by crystallinity differences and reflects the randomization which has been achieved in the hydrogenated polybutadiene block. All the resins are completely soluble to give clear solutions above the melting point of the crystallites, but tend to come out of solution to varying degrees when cooled. The chemically hydrogenated resin has more randomization in the hydrogenated polybutadiene block; hence it has shorter polymethylene sequences and is less crystalline and more soluble. The greater randomization arises from two causes as already pointed out: (1) some cyclization accompanies the chemical hydrogenation to introduce a new randomizing group and (2) the reduction of a given type of unsaturation is more random so that residual unsaturation of any given type is randomly distributed to more effectively break up crystallites rather than occurring in short unhydrogenated segments. The data also show that the apparent viscosity average molecular weight as measured in toluene increases with degree of catalytic hydrogenation; whereas it is almost unaffected by chemical hydrogenation. This is also probably a manifestation of the crystallinity development.

The batch polymerizations were conducted exactly as described in Example 2 except that the 0.5 g of resin stabilizer used in the various runs was added as a 1% solution in methyl chloride from the traps rather than being added as a dry powder as in Example 2. The amount of additional methyl chloride diluent used was adjusted to compensate for that added with the stabilizer so that feed composition was identical to that of Example 2. Polymerizations were conducted with the bath at −65° C. by dropwise addition of 0.3% ethyl aluminum dichloride catalyst solution in methyl chloride.

The control run A with no added stabilizer and Run F with 0.5 g of the insoluble, fully catalytically hydrogenated resin added as a dispersion both resulted in an unstable butyl slurry which agglomerated completely as produced. The other resins all stabilized the butyl slurry to varying degrees and resulted in varying degrees of residual cationic activity as evidenced by the amount of non-extractable stabilizer (which had become chemically bonded to the butyl rubber). Results of the batch polymerizations are summarized in the following table:

EVALUATION OF HYDROGENATED KRO1-K
AS A BUTYL SLURRY STABILIZER

| Run | Stabilizer | $\overline{M}_v$ Of Butyl Produced | % Stabilizer Extracted By MEK | Appearance Of Butyl Slurry In MIBK At R.T. |
|---|---|---|---|---|
| A | None-Control | 225,000 | — | Completely agglomerated. |
| B | KRO1-K | 230,000 | 50% (contains 30% bonded butyl) | Particulate slurry; 3 microns to 1 mm weight average 1 mm. |
| C | CHKRO1-III 36% Cat. Hydrogenated | 235,000 | 60% (contains 30% bonded butyl) average 20 | Fluid milky slurry; 3–30 microns; wt. microns. |
| D | CHKRO1-VIII 50% Cat. Hydrogenated | 230,000 | 10% (contains 30% bonded butyl) | Coarse dispersion; 1 mm to 12 mm; wt. average 8 mm. |
| E | CHKRO1-IV 75% Cat. Hydrogenated | 230,000 | 0 | No dispersion; coalesced polymer up to 1 inch. |
| F | CHKRO1-I 100% Cat. Hydrogenated | 220,000 | 0 | Completely agglomerated. |
| G | HKRO1-XIV 85% Chem. Hydrogenated | 225,000 | 100% | Fluid, milky; wt. avg. <1 micron. |

Only the chemically 85% hydrogenated resin used in Run G was a desirable slurry stabilizer; it yielded a very stable milky butyl slurry and displayed no undesirable cationic activity with 100% of the hydrogenated resin being extractable unchanged in MEK. The unhydrogenated KRO1-K used in Run B was somewhat effective as a slurry stabilizer but was becoming extensively bonded to the butyl during polymerization. It was only 50% extractable in MEK and the extracted resin had about 30% butyl bonded to it; it would produce gel under some high conversion continuous butyl polymerization conditions. The catalytically 36% hydrogenated resin used in Run C was a more effective stabilizer than the original KRO1-K but was less effective than the chemically 85% hydrogenated resin. The 36% hydrogenated resin was still evidencing undesirable cationic activity; it was only partially extractable and the extractable resin contained a significant level of bonded butyl. The catalytically 50% hydrogenated resin used in Run D was a much poorer stabilizer than the unhydrogenated KRO1-K and was still showing objectionable cationic activity. The catalytically 75% and 100% hydrogenated resins used in Runs E and F respectively were so poorly soluble under butyl reaction conditions due to crystallinity that they were unsatisfactory as slurry stabilizers.

This work shows that this catalytic hydrogenation technique does not produce a preferred slurry stabilizer for butyl polymerization starting with a block copolymer of the structure and butadiene microstructure of KRO1-K. Solubility characteristics of the catalytically hydrogenated resin are adversely affected by the development of crystallinity before the degree of hydrogenation has proceded far enough to eliminate undesirable cationic activity and before it has proceded far enough to produce a preferred stabilizer. Some additional randomization to delay the onset of crystallinity to higher hydrogenation levels (such as the cyclization produced by chemical hydrogenation) is required with this resin structure in order to produce a preferred butyl slurry stabilizer by hydrogenation.

EXAMPLE 8

The polybutadiene microstructure in KRO1-K is about 12% 1,2 and 88% 1,4 with a mixed cis and trans configuration. The data of Example 7 show that this microstructure does not provide enough randomizing butene-1 units (1,2 incorporated butadiene units) to permit hydrogenation to the level required for a preferred butyl slurry stabilizer before crystallinity develops to adversely affect solubility and effectiveness as a stabilizer. The crystallinity is the result of long polymethylene sequences formed by hydrogenating the 1,4 incorporated butadiene units; these sequences are broken up by the butene-1 units and by unhydrogenated 1,4 units in the partially hydrogenated polybutadiene blocks.

In order to increase the randomization of the polybutadiene block and permit a higher hydrogenation level to be reached before solubility was adversely affected, a higher 1,2 content experimental polymer of the KRO1-K type polymer was prepared, hydrogenated and evaluated as a slurry stabilizer. The experimental polymer had the same styrene/butadiene block configuration as KRO1-K with 62 mole % styrene and 38 mole % butadiene and a viscosity average molecular weight of 126,000. However, the polybutadiene block 1,2 content was raised to 32% to provide more randomization. Catalytic hydrogenation was accomplished as described in Example 3B using hydrogen in a rocker bomb with a Cobalt II octoate/triethyl aluminum catalyst system. The resins prepared for evaluation are identified in the following table:

MEDIUM VINYL EXPERIMENTAL
COPOLYMER STABILIZERS

| Stabilizer | Hydrogenation, % | $\overline{M}_v$ | Appearance Of MeCl Solution[a] |
|---|---|---|---|
| Med Vinyl K-Resin | 0 | 126,000 | Clear |

-continued

| MEDIUM VINYL EXPERIMENTAL COPOLYMER STABILIZERS | | | |
|---|---|---|---|
| Stabilizer | Hydrogenation, % | $\overline{M}_v$ | Appearance Of MeCl Solution[a] |
| CHMVK-II | 77 | 130,000 | Sl. Hazy |
| CHMVK-I | 100 | 137,000 | V. Hazy, Turbid |

[a] 1% Solution in methyl chloride at −40° C.

These resins were dissolved in methyl chloride in heated rocker bombs at 70° C. and then chilled and removed into glass traps in the dry box as in Example 7. The data show little change in apparent viscosity average molecular weight in toluene due to hydrogenation and much improved solubility compared to the normal 12% 1,2 content copolymer resins of Example 7. This 77% hydrogenated medium vinyl copolymer is about as soluble as the 36% hydrogenated standard copolymer resin of Example 7, and even the fully hydrogenated medium vinyl copolymer is soluble; the fully hydrogenated, lower vinyl content copolymer was insoluble. Nevertheless the fully hydrogenated medium vinyl resin is still quite borderline in solubility and yields a very hazy, turbid solution in methyl chloride at −40° C.

Batch polymerizations were conducted as in Example 7 with the results tabulated below:

| STABILIZER BATCH POLYMERIZATIONS (−65° C. BATH TEMP.) | | | | |
|---|---|---|---|---|
| Run | Stabilizer | $\overline{M}_v$ Of Butyl Produced | % Stabilizer Extracted By MEK | Appearance Of Butyl* Slurry In MIBK At R.T. |
| A | Medium Vinyl K-Resin | Gel | 0 | Completely Agglomerated. |
| B | CHMVK-II 77% Hydrogenated | 225,000 | 100% but contains some bonded butyl | Milky particulate slurry; 2 microns to 1 mm. |
| C | CHMVK-II 100% Hydrogenated | 225,000 | 100% | Particulate dispersion; 1 to 2 mm. |

*All at 1% stabilizer on monomers.

The unhydrogenated medium vinyl copolymer used in Run A was a poorer slurry stabilizer than normal low vinyl KRO1-K as used in Run B of Example 7. The higher number of 1,2 butdiene units resulted in greatly enhanced cationic activity so that the medium vinyl copolymer became extensively multiple-bonded to the butyl during polymerization to produce a completely insoluble gelled butyl product. On the other hand, the hydrogenated medium vinyl copolymer used in Runs B&C were much better slurry stabilizers than the similarly hydrogenated low vinyl KRO1-K of Example 7.

The 77% hydrogenated medium vinyl copolymer used in Run B was a fairly effective butyl slurry stabilizer and had a very low level of residual cationic activity. The fully hydrogenated resin used in Run C was somewhat less effective as a stabilizer and showed no undesirable cationic activity at all—the resin was completely extractable unchanged after polymerization. These experiments show that increasing the 1,2 content of the polybutadiene has increased the degree of randomness of the hydrogenated polymer and made it possible to achieve a desirable butyl slurry stabilizer by catalytic hydrogenation. However, even these catalytically hydrogenated resins are not as effective stabilizers as the chemically partially hydrogenated copolymer used in Run G of Example 7 and in the earlier examples.

The additional randomization achieved by cyclization during chemical hydrogenation is more effective than that achieved by the increase in 1,2 content from 12 to 32%. The chemically 85% hydrogenated 12% vinyl resin is more soluble and more effective as a butyl slurry stabilizer than any level of catalytically hydrogenated medium vinyl resin. With this 32% vinyl resin an hydrogenation level of greater than 70% is required to eliminate the objectionable cationic activity and such a catalytic hydrogenation level is already high enough to have some adverse effect on solubility and performance as a butyl slurry stabilizer.

This work with the medium vinyl copolymer again substantiates the general findings of this invention that partial hydrogenation of butadiene/styrene block copolymers reduces or eliminates undesirable cationic activity and improves performance as a butyl slurry stabilizer until solubility properties are adversely affected by apparent crystallinity. The onset of crystallinity can be delayed to higher hydrogenation levels by introducing more randomizing units into the polybutadiene chain to break up long sequences of hydrogenated 1,4 incorporated butadiene units which form crystallizable polymethylene sequences.

EXAMPLE 9

Experimental styrene/butadiene block copolymers of even higher vinyl content than the medium vinyl copolymer of Example 8 were prepared, hydrogenated and evaluated to try to even further randomize the hydrogenated diene chain and improve solubility and performance as a butyl slurry stabilizer. The new polymers were prepared at 48 mole % styrene and 52 mole % butadiene and a tetrafunctional coupling agent was used to produce a 4-arm star polymer with the polystyrene blocks on the periphery and the polybutadiene blocks in the center. In one polymer the 1,2 content of polybutadiene blocks was increased to 39% whereas in the other it was raised still further to 47%. The polybutadiene blocks were essentially fully catalytically hydrogenated as in Example 3B without any polystyrene hydrogenation. The resins are identified and described in the following table:

| HYDROGENATED HIGH VINYL BUTADIENE/STYRENE STAR BLOCK COPOLYMERS | | | | |
|---|---|---|---|---|
| Stabilizer | % Hydrogenated | Polybutadiene 1,2 Content | $\overline{M}_v$ | Appearance Of 1% MeCl Solution[a] |
| A | 100 | 39 | 127,000 | Very slightly hazy. |
| B | 95 | 47 | 125,000 | Nearly clear, trace haziness. |

[a] 1% solution in methyl chloride at −40° C.

In order to prepare solutions for evaluation in batch polymerization runs, the resins were dissolved in methyl chloride in heated and shaken bombs at 70° C. and then chilled and removed into glass traps in the dry box as in Example 7. Both of these high vinyl content fully hydrogenated butadiene/styrene resins had good solubility in methyl chloride. The additional randomization provided by the butene-1 units in the hydrogenated polybutadiene blocks was effectively breaking-up crystallinity and allowing the resins to remain soluble at high hydrogenation levels. This work has shown that solubility of hydrogenated styrene/butadiene resins improves dramatically as the butadiene microstructure is changed from 12% 1,2 (insoluble at 100% hydrogenation—Example 7) to 32% 1,2 (soluble as very hazy turbid solution—Example 8) and continues to improve slowly as the 1,2 content is further raised to 39% and then 47% (resins A and B of this example). There is a dramatic improvement in solubility up to about 35% vinyl content and then little further change.

Batch polymerizations were conducted with these resins as in Example 7 with the results tabulated below:

EVALUATION OF HYDROGENATED HIGH VINYL BUTADIENE/STYRENE STAR BLOCK COPOLYMERS AS BUTYL SLURRY STABILIZERS

| Run | Stabilizer | $\bar{M}_v$ Of Butyl Produced | Stabilizer Extracted By MEK | Appearance Of Butyl Slurry* In MIBK At R.T. |
|---|---|---|---|---|
| A | A (39% 1,2) | 225,000 | 100 | Particulate dispersion ~1 mm |
| B | B (47% 1,2) | 220,000 | 20 | Completely agglomerated |
| C | None | 225,000 | — | Completely agglomerated |

*All at 1% stabilizer on monomers.

The fully hydrogenated 39% vinyl resin (A) was a fairly effective butyl slurry stabilizer with essentially no residual cationic activity, but was not significantly better than the fully hydrogenated 32% vinyl resin used in Run C of Example 8. It was less effective than the partially hydrogenated 32% vinyl resin of Run B Example 8 and was much less effective than the chemically 85% hydrogenated resin of Run G of Example 7. The nearly fully hydrogenated 47% vinyl resin B was almost ineffective as a butyl slurry stabilizer. The butyl slurry agglomerated during warming and at room temperature was no better than the control run with no slurry stabilizer added. Surprisingly, this resin was also only partially extractable despite the high hydrogenation level.

These data show that too high a vinyl content in the polybutadiene block is undesirable for a butyl slurry stabilizer. Carbon 13 NMR analyses show that at the 47% vinyl level there are many diads and triads of butene-1 sequences in the hydrogenated polybutadiene and it is believed that these sequences are even more detrimental to performance as a slurry stabilizer than the polymethylene sequence which result from hydrogenation of 1,4 butadiene sequences in the polybutadiene block. Furthermore too high a 1,2 content is also undesirable because sequences of 1,2 units are more difficult to hydrogenate than isolated 1,2 units so that very high hydrogenation levels are required to fully remove all the 1,2 units when sequences are present; and any residual 1,2 units left unhydrogenated confer undesirable cationic activity for use as a butyl slurry stabilizer. The preferred 1,2 content is that which will most randomize the 1,4 sequences without forming too many 1,2 sequences. Experimentally, a level of between 32 and 44% 1,2 units is most preferred.

These data show that whereas increasing the vinyl content in the polybutadiene block can randomize the fully hydrogenated block enough to permit the retention of solubility in methyl chloride at −40° C. and allow the block copolymer to function as a butyl slurry stabilizer, the effectiveness of the fully hydrogenated block copolymer is less than that of similar block copolymers containing additional randomizing units. Thus the chemically 85% hydrogenated resin of Run G Example 7 in which randomization is provided by 12% 1,2 units; 15% residual unhydrogenated 1,4 units; and some cyclized units is more effective as a slurry stabilizer then the fully hydrogenated resin at any vinyl content. Also the catalytically 77% hydrogenated 32% vinyl resin of Run B Example 8 in which randomization is provided by 32% 1,2 units and 23% residual unhydrogenated 1,4 unit is more effective than the fully hydrogenated resin at any vinyl content. Increasing the vinyl content of the polybutadiene block does break up polymethylene sequences in the hydrogenated polymer, particularly where hydrogenation is by catalytic means, but begins to form detrimental butene-1 sequences before sufficient randomization of the polymethylene sequences is achieved. An additional randomizing factor is required for the most preferred performance as a slurry stabilizer.

EXAMPLE 10

Additional styrene/butadiene block copolymers with a vinyl content of 37% were prepared, partially catalytically hydrogenated, and evaluated as butyl slurry stabilizers to better define the preferred hydrogenation level at this vinyl level. (i.e. the hydrogenation level which would minimize undesirable cationic activity and yet leave enough residual unhydrogenated 1,4 butadiene units to provide the additional randomization required for preferred performance.) These new styrene/butadiene block copolymers were prepared with 49 mole % styrene and 51 mole % butadiene and were coupled with a tetrafunctional coupling agent as in Example 9 to produce 4-arm polymers with the polystyrene on the periphery and the polybutadiene blocks in the center. They were catalytically partially hydrogenated as outlined in Example 3B. The resins are identified and described in the following table:

CATALYTICALLY PARTIALLY HYDROGENATED 37% VINYLBUTADIENE/STYRENE STAR BLOCK COPOLYMERS

| Stabilizer[a] | Percent Hydrogenated | Residual[b] 1,2 Unsaturation % | Residual[b] 1,4 Unsaturation % | $\bar{M}_v$ | Appearance Of 1% MeCl Solution[c] |
|---|---|---|---|---|---|
| A-1 | 33 | 15 | 52 | 116,000 | Clear |
| A-2 | 58 | 2 | 40 | 115,000 | Nearly clear trace haziness. |
| A-3 | 82 | 0 | 18 | 119,000 | Nearly clear trace haziness. |
| B-1 | 82 | 0 | 18 | 105,000 | Nearly clear trace haziness. |
| B-2 | 87 | 0 | 13 | 103,000 | Nearly clear trace haziness. |
| B-3 | 90 | 0 | 10 | 101,000 | Nearly clear trace haziness. |

[a]Base resins A and B differ only in molecular weight.
[b]Percentage of butadiene units not hydrogenated.
[c]1% Solution in methyl chloride at −40° C.

As in the previous examples 1% solutions of the resins in methyl chloride were prepared by dissolution at 70° C. in bombs and then cooling and removal into traps in the dry box for observation and use.

The partially hydrogenated resins all had good solubility in methyl chloride with just a trace of haziness at −40° C. and no change in appearance on further cooling to −95° C. There is also no change in apparent viscosity average molecular weight with degree of hydrogenation. The data indicate that with a 37% 1,2 content in the base resin and under the catalytic hydrogenation conditions used, a hydrogenation level of 70% is required to totally saturate all the 1,2 units.

Batch polymerizations were conducted with these resins as in Example 7 for comparison with the chemically 85% hydrogenated K-Resin of Run G Example 7 and the catalytically fully hydrogenated resins of Run C Example 8 and Run A Example 9. In Example 7 through 9 the amount of stabilizer was held constant at 1% on monomers whereas in these runs the amount of stabilizer was reduced to 0.75% to better rank the more effective stabilizers.

EVALUATION OF HYDROGENATED BUTADIENE/STYRENE BLOCK COPOLYMERS AS BUTYL SLURRY STABILIZERS[a]

| Run | Stabilizer | $\overline{M}_v$ Of Butyl Produced | % Stabilizer Extracted By MEK | Appearance Of Butyl Slurry In MIBK At R.T. |
|---|---|---|---|---|
| 1 | Example 10 A-1 | Gel | 0 | Particulate dispersion; 1 mm to 3 mm. |
| 2 | Example 10 A-2 | Gel | 0 | Particulate dispersion; 1 mm to 3 mm. |
| 3 | Example 10 A-3 | 225,000 | 100 | Milk <1 to 3 microns. |
| 4 | Example 10 B-1 | 230,000 | 100 | Milk <1 to 3 microns. |
| 5 | Example 10 B-2 | 220,000 | 100 | Milk <1 to 5 microh$; Avg. 2 microns. |
| 6 | Example 10 B-3 | 215,000 | 100 | Milk <1 to 3 microns. |
| 7 | Example 8 CHMIK-1 | 225,000 | 100 | Particulate dispersion; 1 mm to 3 mm. |
| 8 | Example 9A | 225,000 | 100 | Particulate dispersion; 1 mm to 3 mm. |
| 9 | Example 7G | 230,000 | 100 | Milky particulate slurry; 10 microns to 1 mm. |

[a] Batch polymerization at −65° C. bath temperature. Stabilizer level, 0.75 wt. % on monomers.

The data shown that the stabilizers at low hydrogenation levels 10A-1, and 10A-2 have too much residual 1,2 unsaturation and result in a gelled butyl product. The 37% vinyl stabilizers between 80 and 90% hydrogenated, 10A-3 to 10B-3, are excellent butyl slurry stabilizers and yield a stable colloidal butyl dispersion at only 0.75% stabilizer. Furthermore they show no undesirable cationic activity since all the 1,2 butadiene units plus the more reactive of the 1,4 units have been saturated. The chemically 85% hydrogenated low vinyl copolymer, 7G, is a good stabilizer but less efficient than the optimally partially catalytically hydrogenated 37% vinyl resin; and the fully hydrogenated medium vinyl resin, 8 CHMVK-I and 9A, are still less effective.

These data show that partially hydrogenated styrene/butadiene copolymer resins of the proper composition and with sufficient randomization built into the hydrogenated polybutadiene block are preferred butyl slurry stabilizers. The additional randomization provided by leaving some residual 1,4 butadiene units unhydrogenated has greatly improved performance.

EXAMPLE 11

Additional styrene/butadiene block copolymers were prepared with styrene contents between 46 and 65 mole %, (61 and 78 weight %) with vinyl contents between 32 and 44%, and with various hydrogenation levels. These block copolymers were coupled with a difunctional coupling agent to give linear triblocks with the styrene at the ends and with an approximately constant $\overline{M}_v$ of 105,000. They were partially catalytically hydrogenated by the method of Example 3B. The resins are identified and described in the following table:

CATALYTICALLY PARTIALLY HYDROGENATED BUTADIENE/STYRENE LINEAR TRIBLOCK POLYMERS

| Stabilizer | Percent Hydrogenated | Residual Unsaturation, % 1,2 | 1,4 | $\overline{M}_v$ | Appearance Of 1% MeCl Solution[a] |
|---|---|---|---|---|---|
| A | 0 | 43 | 57 | 108,000 | Clear |
| B | 74 | Trace | 26 | 107,000 | Nearly clear, trace haziness |
| C | 84 | 0 | 16 | 105,000 | Nearly clear, trace haziness |
| D | 94 | 0 | 6 | 110,000 | Slightly hazy |

[a] 1% Solution in Methyl Chloride at −40° C.

Residual 1,2 unsaturation has essentially disappeared at 74% hydrogenation. Solubility in methyl chloride is just beginning to deteriorate as indicated by haziness of the 1% solution at 94% hydrogenation.

Batch polymerizations were conducted as in the previous examples with the results summarized below:

EVALUATION OF CATALYTICALLY PARTIALLY HYDROGENATED BUTADIENE/STYRENE LINEAR TRIBLOCK POLYMERS

| Stabilizer | % On Monomers | $\overline{M}_v$ Of Butyl | % Stabilizer Extracted By MEK | Appearance Of Butyl Slurry In MIBK At R.T. |
|---|---|---|---|---|
| A | 1.0 | Gel | 0 | Particulate dispersion 1 mm to 5 mm. |
| A | 0.75 | Gel | 0 | All agglomerated |
| B | 0.75 | 220,000 | 100 | Milk <1 to 5; Avg. 2-3 microns. |
| B | 0.50 | 225,000 | 100 | Milk <1 to 20;.Avg. 8-10 microns. |
| C | 0.75 | 215,000 | 100 | Milk <1 to 20; Avg. 5 to 10 microns. |
| C | 0.50 | 230,000 | 100 | Milk <5 to 50; Avg. 10 to 20 microns. |
| D | 1.0 | 230,000 | 100 | Milk <1 to 10; Avg. 1 to 2 microns. |
| D | 0.75 | 225,000 | 100 | Particulate dispersion ~1 mm. |

The unhydrogenated polymer A produces a gelled butyl product and is unacceptable as a stabilizer. The 74 and 84% hydrogenated triblock polymers B&C are preferred butyl slurry stabilizers producing colloidal butyl dispersions at only 0.5% stabilizer with no undesirable cationic activity. The 94% hydrogenated triblock polymer D is a somewhat less efficient stabilizer with 1% being required to produce a colloidal butyl dispersion.

These data again show that partially hydrogenated styrene/butadiene block copolymers of the right composition are preferred butyl slurry stabilizers but there is a preferred hydrogenation level for best performance.

Based on these experiments, a preferred vinyl level would be from about 20 to about 46, most preferred from about 32 to about 44%; a preferred hydrogenation level via homogeneous catalytic hydrogenation by the method of Example 3B is preferably from about 60 to about 95%, most preferably from about 70 to about 90%.

EXAMPLE 12

Additional styrene/butadiene linear triblock polymers similar to those in Example 11 were prepared at various molecular weights to define the optimum molecular weight range for polymers of this structure. The polymers were all prepared with styrene contents, vinyl contents, and hydrogenation levels within the ranges previously defined as preferred. The resins are identified and described in the following table:

| CATALYTICALLY PARTIALLY HYDROGENATED BUTADIENE/STYRENE LINEAR TRIBLOCK POLYMERS | | | |
|---|---|---|---|
| Stabilizer | Percent Hydrogenated | $\overline{M}_v$ | Appearance Of 1% MeCl Solution[a] |
| A | 78% | 36,000 | Nearly clear, trace haziness. |
| B | 80% | 47,000 | Nearly clear, trace haziness. |
| C | 85% | 76,000 | Nearly clear, trace haziness. |
| D | 74% | 107,000 | Nearly clear, trace haziness. |
| E | 84% | 121,000 | Nearly clear, trace haziness. |
| F | 66% | 139,000 | Nearly clear, trace haziness. |

[a]1% Solution in Methyl Chloride at −40° C.

All the polymers displayed good solubility in methyl chloride.

The results of batch polymerization trials as in the previous examples are summarized below:

| EVALUATION OF CATIONICALLY PARTIALLY HYDROGENATED BUTADIENE/STYRENE LINEAR TRIBLOCK POLYMERS | | | | |
|---|---|---|---|---|
| Stabilizer | % On Monomers | $\overline{M}_v$ Of Butyl Produced | % Stabilizer Extracted By MEK | Appearance Of Butyl Slurry In MIBK @ R.T. |
| A | 1.0 | 220,000 | 100 | No dispersion all agglomerated |
| B | 1.0 | 230,000 | 100 | Particulate dispersion 1 to 6 mm. |
| C | 0.5 | 225,000 | 100 | Milk <1 to 4; Avg. 2 microns. |
| D | 0.5 | 225,000 | 100 | Milk <1 to 20; Avg. 8 to 10 microns. |
| E | 0.75 | 230,000 | 100 | Milk <1 to 5; Avg. 1 to 2 microns. |
| F | 0.75 | 215,000 | 100 | Milk <1 to 3; Avg. 1 to 2 microns. |

Runs were made with 1% stabilizer and then with successively lower levels until a level was reached below which a colloidal butyl slurry was no longer achieved. Only the lowest stabilizer level giving a colloidal butyl slurry is recorded. The data show that the lowest molecular weight stabilizer is not effective and fails to yield a stable butyl slurry even at 1%. The 47,000 $\overline{M}_v$ stabilizer is better but still fails to yield a colloidal butyl slurry at 1%. The stabilizers at $\overline{M}_v$'s of 76,000 and 107,000 yield colloidal butyl slurries at 0.5%, while the higher molecular weight stabilizers needed 0.75% to yield colloidal butyl slurries, but were still very effective.

These data indicate that there is a preferred molecular weight of the butyl slurry stabilizer, but the specific level is also dependent upon resin structure and composition and must be determined experimentally. For the linear triblock polymers of Examples 11 and 12, with approximately 46 to 65 mole % styrene a preferred $\overline{M}_v$ is broadly between 45 and 200,000; most preferably between 70 and 140,000.

EXAMPLE 13

A series of styrene/isoprene block copolymers were prepared and evaluated as butyl slurry stabilizers in batch polymerization trials as in the previous examples. Some of the block copolymers were mildly effective in stabilizing the butyl slurries but all produced a completely gelled butyl product and so would be generally unacceptable as butyl slurry stabilizers in a typical mnaufacturing environment. Partial hydrogenation of the block copolymers improved performance as stabilizers but still yielded a gelled butyl product. The unsaturation in polyisoprene is much more cationically active under butyl polymerization conditions than the unsaturation in polybutadiene and even a small amount of residual unsaturation in the polyisoprene block produced a gelled butyl product. Resins which were fully hydrogenated by the methods of Example 3B and contained the preferred styrene content produced stable butyl slurries with no gel. The fully hydrogenated styrene/isoprene block copolymers were soluble in methyl chloride (at sufficiently high styrene content) because the fully hydrogenated polyisoprene forms a non-crystalline alternating ethylene/propylene rubber chain.

Styrene/isoprene block copolymers may also be coupled to linear triblock polymers or multiarm star polymers as described for the styrene/butadiene block polymers in the earlier examples. As with the styrene/butadiene polymers these more complex structures with the styrene on the periphery and the hydrogenated isoprene in the central coupled portion are preferred structures for butyl slurry stabilizer. All the isoprene polymers at sufficiently high styrene content retain methyl chloride solubility at 100% hydrogenation and should preferably be 100% hydrogenated if the formation of gelled butyl products is to be avoided. Some examples of hydrogenated styrene/isoprene block copolymers and their performance as butyl slurry stabilizers in batch dry box runs are shown in the following table:

| HYDROGENATED STYRENE/ISOPRENE BLOCK POLYMERS AS BUTYL SLURRY STABILIZERS | | | | | | |
|---|---|---|---|---|---|---|
| Stabilizer | Wt. % Styrene | % Hydrogenation Of Isoprene | $\overline{M}_y$ | Structure | % On Butyl Monomers | Appearance Of Butyl Slurry In MIBK At R.T. |
| None | — | — | — | — | — | Totally agglomerated. |
| A | 74 | 100 | 120,000 | 4-arm star | 1.0 | Milk <<1 to 10; avg. 1 micron. |
| A | 74 | 100 | 120,000 | 4-arm star | 0.75 | Milk <<1 to 4 microns. |
| A | 74 | 100 | 120,000 | 4-arm star | 0.50 | Milk <<1 to 20; avg. 2 microns. |
| B | 74 | 0 | 120,000 | 4-arm star | 1.0 | Totally agglomerated. |
| C | 74 | 100 | 89,000 | Linear Triblock | 0.75 | Milky particulate, 2 microns to 1 mm. |
| C | 74 | 100 | 89,000 | Linear Triblock | 0.50 | Milky particulate, 2 microns to 1 mm. |
| D | 69 | 100 | 149,000 | Diblock | 1.0 | Milky particulate, 1 micron to 1 mm. |

The unhydrogenated 4-arm star polymer is not an effective stabilizer and a completely gelled butyl product resulted. All the 100% hydrogenated polymers were effective as slurry stabilizers and showed no undesirable cationic activity. The 4-arm star polymer A was most effective yielding a colloidal butyl dispersion at only 0.5% on butyl monomers. The linear triblock was next most effective with the diblock being least effective. The unhydrogenated version of the 4-arm star polymer was ineffective as a slurry stabilizer in addition to its tendency to produce a gelled butyl product.

What is claimed is:

1. An improved method of stabilizing a polymerization slurry against agglomeration, said slurry being formed in a cationic Lewis Acid catalyzed polymerization process, and containing as product polymers, polymerized $C_4$–$C_7$ isoolefin homopolymers or butyl rubber copolymers in a polymerization diluent selected from the group consisting of methyl chloride, methylene chloride, vinyl chloride or ethyl chloride diluents, which comprises incorporating into the reaction mixture, said reaction mixture comprising monomers, catalyst and diluent, or into the polymerization product slurry about 0.05% to 20% by weight, based upon the weight of product polymers, of a stabilizing agent, said stabilizing agent being a preformed copolymer having a lyophilic; polymerization diluent soluble portion and a lyophobic; polymerization diluent insoluble portion, said lyophobic portion being soluble in or adsorbable by said product polymer and said stabilizing agent being capable of forming an adsorbed solubilized polymer coating around the precipitated isoolefin homopolymer or butyl rubber copolymer to stabilize said slurry, wherein the improvement comprises utilizing as said preformed copolymer stabilizing agent, an hydrogenated block copolymer wherein cationically active unsaturation initially present in said stabilizing agent has been reduced and stabilizing effectiveness has been increased by said hydrogenation without causing said stabilizing agent to become insoluble in said reaction mixture, wherein the lyophobic portion of the preformed copolymer prior to hydrogenation is a member of the group consisting of polymerized $C_4$–$C_7$ isoolefins, butyl rubber copolymers, polybutadiene, polyisoprene, EPDM terpolymers, styrene/butadiene random copolymers of low styrene content (SBR rubbers), and mixtures thereof, the lyophobic portion having a degree of polymerization of at least about 10.

2. The method of claim 1 wherein the structure of said block copolymer is a member of the group consisting of diblock, radial block, taper block, star block, linear triblock and multidiblock copolymers.

3. The method of claim 1 wherein said lyophilic portion is a member of the group consisting of polystyrene, polyvinyl chloride, polyvinyl bromide, neoprene and mono-, di- and trisubstituted polystyrenes, and mixtures thereof, the substituents being halogen or $C_1$–$C_5$ alkyl groups, said lyophilic portion having a degree of polymerization of from about 20 to about 6,000.

4. The method of claim 1 wherein said preformed copolymer stabilizing agent is selected from the group consisting of styrene/diene block and graft copolymers.

5. The method of claim 3 wherein said lyophobic portion is polybutadiene and said lyophilic portion is polystyrene.

6. The method of claim 3 wherein said lyophobic portion is polyisoprene and said lyophilic portion is polystyrene.

7. The method of claim 3 wherein said lyophilic portion is polystyrene and said polystyrene block content is present in said stabilizing agent at a level of more than about 45 weight percent.

8. The method of claim 7 wherein the lyophobic portion prior to hydrogenation is polybutadiene.

9. The method of claim 7 wherein the lyophobic portion prior to hydrogenation is polyisoprene.

10. The method of claim 8 wherein the initial concentration of vinyl unsaturation in said polybutadiene portion of said block copolymer prior to hydrogenation is about 5 to about 50 mole percent.

11. The method of claim 1 wherein hydrogenation is accomplished by chemical means.

12. The method of claim 1 wherein hydrogenation is accomplished by catalytic means.

13. The method of claim 11 wherein said chemical means includes the use of a reagent selected from the group consisting of diisobutyl aluminum hydride and p-toluene-sulfonyl-hydrazide.

14. The method of claim 12 wherein said catalytic means include homogeneous and heterogeneous hydrogenation catalysts.

15. The method of claim 14 wherein said homogeneous catalyst includes soluble complexes of nickel, rhodium, irridium, platinum, osmium, iron, or ruthenium and nickel or cobalt carboxylates in combination with lithium or aluminum alkyls.

16. The method of claim 14 wherein said heterogeneous catalyst includes supported platinum, palladium or rhodium, and promoted and supported nickel, and Raney nickel.

17. The method of claim 8 wherein said stabilizer is hydrogenated by chemical means to the extent of about 40 to about 90 percent of the original unsaturation present.

18. The method of claim 9 wherein more than about 80% of the original unsaturation present in said stabilizer is hydrogenated.

19. The method of claim 10 wherein said vinyl unsaturation prior to hydrogenation is about 10 to about 48 mole percent.

20. The method of claim 10 wherein the initial concentration of said vinyl unsaturation is about 20 to about 46 mole percent prior to hydrogenation.

21. The method of claim 10 wherein hydrogenation is by homogeneous catalytic means to the extent of about 50 to about 100 percent of the original unsaturation present.

22. The method of claim 10 wherein homogeneous catalytic means are used to hydrogenate about 60 to about 95 percent of said vinyl unsaturation.

23. The method of claim 22 wherein said stabilizer has a viscosity average molecular weight of from about 45,000 to about 200,000.

24. The method of claim 10 wherein homogeneous catalytic means are used to hydrogenate about 70 to about 90 percent of the total unsaturation wherein said vinyl unsaturation is originally present at a level of about 32 to about 44 mole percent and wherein said stabilizer has a linear triblock structure and a viscosity average molecular weight of from about 70,000 to 140,000.

25. The method of claim 1 wherein the diluent is methyl chloride.

26. The method of claim 1 wherein the product polymer is butyl rubber or polyisobutylene homopolymer.

27. The method of claim 26 wherein the product polymer is isobutylene-isoprene butyl rubber having a viscosity average molecular weight of about 100,000 to about 800,000.

28. The method of claim 26 wherein the isobutylene-isoprene butyl rubber has a viscosity average molecular weight of about 250,000 to about 600,000 and the diluent is methyl chloride.

29. A stabilized slurry produced by the method of claim 1.

30. An improved method of preparing non-agglomerating homopolymers of $C_4$-$C_7$ isoolefins or butyl rubber copolymers by Lewis Acid cationic polymerization of corresponding monomers in a polymerization slurry diluent selected from the group consisting of methyl chloride, methylene chloride, vinyl chloride and ethyl chloride diluents in the presence of a stabilizer copolymer, the stabilizer copolymer being a preformed copolymer having a lyophilic diluent soluble portion and a lyophobic diluent insoluble but isoolefin or butyl rubber soluble or adsorbable portion, wherein the improvement comprises utilizing as said preformed copolymer stabilizing agent an hydrogenated block copolymer wherein cationically active unsaturation initially present in said stabilizing agent has been reduced and stabilizing effectiveness has been increased by said hydrogenation without causing said stabilizing agent to become insoluble in said reaction mixture, wherein the lyophobic portion of the preformed copolymer prior to hydrogenation is a member of the group consisting of polymerized $C_4$-$C_7$ isoolefins, butyl rubber copolymers, polybutadiene, polyisoprene, EPDM terpolymers, styrene/butadiene random copolymers of low styrene content (SBR rubbers), and mixtures thereof, the lyophobic portion having a degree of polymerization of at least about 10.

31. The method of claim 30 wherein the butyl rubber is isobutylene-isoprene butyl rubber, the Lewis Acid catalyst is $AlCl_3$ and the diluent is methyl chloride.

32. The method of claim 30 wherein the isoolefin homopolymer is polyisobutylene, the catalyst is $AlCl_3$ and the diluent is methyl chloride.

33. The method of claim 30 in which the slurry contains up to about 50% by weight butyl rubber copolymer or isoolefin homopolymer.

34. The product produced by the method of claim 33 wherein the butyl rubber is isobutylene-isoprene butyl rubber and the diluent is methyl chloride.

35. The product produced by the method of claim 33 wherein the isoolefin homopolymer is polyisobutylene and the diluent is methyl chloride.

36. The method of claim 18 comprising styrene on the periphery and hydrogenated isoprene in the central portion of a structurally complex block copolymer.

37. The method of claim 17 comprising styrene on the periphery and hydrogenated butadiene in the central portion of a structurally complex block copolymer.

38. The method of claim 14 comprising styrene on the periphery and hydrogenated butadiene in the central portion of a structurally complex block copolymer.

39. The method of claim 30, where said preformed copolymer stabilizing agent is selected from the group consisting of styrene/diene block and graft copolymers.

* * * * *